United States Patent
Blank

(10) Patent No.: US 7,493,886 B2
(45) Date of Patent: Feb. 24, 2009

(54) COMBUSTION CONTROL VIA HOMOGENEOUS COMBUSTION RADICAL IGNITION (HCRI) OR PARTIAL HCRI IN CYCLIC IC ENGINES

(76) Inventor: David Alan Blank, 260 S. Buhl Farm Dr., Apt. 209, Hermitage, PA (US) 16148

(*) Notice: Subject to any disclaimer, the term of this patent is extended or adjusted under 35 U.S.C. 154(b) by 127 days.

(21) Appl. No.: 11/695,797

(22) Filed: Apr. 3, 2007

(65) Prior Publication Data
US 2007/0235002 A1 Oct. 11, 2007

Related U.S. Application Data

(60) Provisional application No. 60/789,933, filed on Apr. 7, 2006, provisional application No. 60/865,709, filed on Nov. 14, 2006, provisional application No. 60/885,279, filed on Jan. 17, 2007, provisional application No. 60/892,332, filed on Mar. 1, 2007.

(51) Int. Cl.
*F02B 19/08* (2006.01)
*F02B 19/10* (2006.01)
*F02B 19/14* (2006.01)
*F02B 19/18* (2006.01)
*F02M 25/07* (2006.01)

(52) U.S. Cl. .................. 123/256; 123/263; 123/275; 123/276; 123/292; 123/293; 123/568.14

(58) Field of Classification Search ......... 123/209–211, 123/254–257, 262, 263, 266, 267, 274–279, 123/286–293, 305, 568.14
See application file for complete search history.

(56) References Cited

U.S. PATENT DOCUMENTS 3,092,088 A 6/1963 Goossak et al.
(Continued)

OTHER PUBLICATIONS

Onishi et al., "Active Thermo-Atmosphere Combustion (Atac)—A New Combustion Process for Internal Combustion Engines", SAE paper No. 790501.
(Continued)

*Primary Examiner*—Willis R Wolfe, Jr.
(74) *Attorney, Agent, or Firm*—Smith Moore Leatherwood LLP; Thomas W. Epting; James H. Dapper

(57) ABSTRACT

A process is provided for enhancing homogeneous combustion and improving ignition in rotary and reciprocating piston IC engines. Physical embodiments supporting this process have secondary chambers embedded in the cylinder periphery to initiate radical ignition ("RI") species generation in an earlier cycle for use in the main chamber combustion of a later cycle. These communicate with the main chamber via small conduits. Coordinated with the progressions facilitated by these secondary chambers are novel control measures for regulating the quantities of RI species ultimately generated for and conveyed to the later cycle. The pre-determinable presence of RI species so supplied then alters or adds controlled variety to the dominant chain-initiation reactions of the main combustion ignition mechanism of the later cycle. This presence does so by lowering both the heat and the fuel ratios required for starting and sustaining combustion. While this presence dominates in RI mode embodiments, this presence can also assist ignition and combustion in embodiments that are instead dominated by the spark ignition ("SI") and compression ignition ("CI") modes. The process results in improved combustion with increased efficiencies, decreased emissions and a wider range of fuel tolerances.

42 Claims, 13 Drawing Sheets

U.S. PATENT DOCUMENTS

| | | | |
|---|---|---|---|
| 3,230,939 | A | 1/1966 | Goossak |
| 3,283,751 | A | 11/1966 | Goossak et al. |
| 3,802,827 | A | 4/1974 | Semenov et al. |
| 3,809,024 | A | 5/1974 | Abbey |
| 4,140,090 | A * | 2/1979 | Lindberg ............... 123/265 |
| 4,317,432 | A | 3/1982 | Noguchi et al. |
| 4,442,807 | A * | 4/1984 | Latsch et al. ........... 123/263 |
| 4,898,135 | A | 2/1990 | Failla et al. |
| 4,924,828 | A | 5/1990 | Oppenheim |
| 4,926,818 | A | 5/1990 | Oppenheim et al. |
| 4,974,571 | A | 12/1990 | Oppenheim et al. |
| 4,977,873 | A | 12/1990 | Cherry et al. |
| 5,109,817 | A | 5/1992 | Cherry |
| 5,271,365 | A | 12/1993 | Oppenheim et al. |
| 5,297,518 | A | 3/1994 | Cherry |
| 5,421,299 | A | 6/1995 | Cherry |
| 5,697,332 | A | 12/1997 | Asai et al. |
| 5,855,192 | A | 1/1999 | McCowan et al. |
| 5,862,788 | A | 1/1999 | Pouring et al. |
| 5,887,566 | A * | 3/1999 | Glauber et al. ............ 123/275 |
| 6,092,512 | A | 7/2000 | Ma |
| 6,178,942 | B1 | 1/2001 | di Priolo et al. |
| 6,345,610 | B1 | 2/2002 | Yang |
| 6,595,181 | B2 | 7/2003 | Najt et al. |
| 2004/0163619 | A1 | 8/2004 | Thomas |
| 2005/0121009 | A1 | 6/2005 | Flowers |
| 2006/0016438 | A1 | 1/2006 | Kang |

OTHER PUBLICATIONS

Asai, "A Low-Pressure Pneumatic Direct-Injection, Two-Stroke Engine By Activated Radical Combustion Concept", SAE paper No. 980757.

Najt et al., "Compression-Ignited Homogeneous Charge Combustion", SAE paper No. 830264.

Blank et al., "NoDx Reduction Kinetics Mechanisms and Radical-Induced Autoignition Potential of Egr in I.C. Engines Using Methanol and Hydrogen", SAE paper No. 2001-28-0048.

Murase, "Enhancement of Combustion by Injection of Radicals", SAE paper No. 2000-01-0194.

Hayashi et al., "Performance of a Flame Jet Ignition System in a Two-Stroke Engine", SAE paper No. 2000-01-0199.

Blank, "CNG/Methane-Combustion Kinetics (Without ND2) and Frozen Equilibrium in Radical-Ignition Reduced Compression Ratio D.I. Diesel Engines Using Pistons with Micro-Chambers", SAE paper No. 2004-01-1677.

Blank, "CNG/Methane-Combustion in a Homogeneous-Combustion Radical-Ignition D.I. Diesel Engine", SAE paper No. 2007-01-0047.

Blank, "Hydrogen Combustion in a Novel Rotary DI-HCRI Engine with Low Heat Rejection", SAE 2007-01-1254.

Blank, "Radical Ignition Combustion Studies with Hydrogen in a Two-Stroke DI-HCRI Diesel Engine", SAE paper No. 2007-01-0135.

Blank, "Lean Combustion Chemical-Kinetics Studies of an Ethanol Four-Stroke Radical-Ignition DI-Diesel Engine", SAE paper No. 2007-01-0623.

Blank, "Radical Controlled Autoignition in a HCRI Hydrogen DI Four-Stroke Diesel Engine with Reduced Heat Rejection", SAE paper No. 2007-01-0013.

Mather et al., "Modeling the Use of Air-Injection for Emissions Reductiion in a Direct-Injected Diesel Engine", SAE paper No. 952359.

Blank, "Methanol Hypergolic Combustion Kinetics (Without ND2) and Frozen Equilibrium in Radical-Ignition Reduced Compression Ratio D.I. Engines Using Piston Microchambers", SAE paper No. 2004-01-1847.

* cited by examiner

100

| Event No. & Cycle Timing | Main Chamber Occurrences | Mini-Chamber (M-C) Occurrences |
|---|---|---|
| 1 Exhaust, Intake and Early Main-Compression 105 | RI Species Conveyed via: *Main Chamber Carry Over + Recycling + M-C Carry Over*. Recycling: *RI Species Augmentations* | Pressure Differences: *Transfer M-C RI Species to Main Chambers* |
| 2 By Mid Main-Compression 110 | *Main Chamber Gases Highly Impregnated With RI Species* | |
| 3 After Mid Main-Compression 115 | Temperature Rise: *RI Species to Become Reactive* | Pressure Differences: *Intake Gases +Premixed Fuel Forced Into M-C's* |
| 4 Mid to Late Main-Compression 120 | If Full DI HCRI Case: *Fuel Inserted but No Autoignition* | *Some of Main Chamber DI Fuel Trapped in M-C* |
| 5 Late Main Compression 125 | If Full DI HCRI Case: *Fuel Mixed at least Quasi-Homogeneously* | |
| 6 Late to End Main-Compression 130 | At Below "Lower" Temperatures: *RI Species-Air Mixture Reacting with Fuel* | RI Species Generation Regulated by: *Control Fluid + Generation Augmentation-Control Devices* |
| 7 Just After Start of Expansion 135 | Ignition: *Involves Fuel-OH Decomposition + OH and Pressure Peak* | Pressure Differences: *Main Chamber OH + Energy Driven Into M-C* |
| 8 Early to Before Mid Expansion 140 | | OH-Induced RI Species Generation: *Production Sensitive to M.-C. Temperature, M-C Volume and % Fuel in M-C* |
| 9 Well Before Mid Expansion to Blow-Down and Exhaust 145 | M-C RI Species and Unused Fuel Transferred to Main Chambers. Results: *RI Species Generation +Radical Retention; RI Species Go into/(or)near Frozen Equilibrium* | Temperature Drops: *RI Species Go Into Frozen Equilibrium* |

COMBUSTION CONTROL VIA HOMOGENEOUS COMBUSTION RADICAL IGNITION (HCRI) OR PARTIAL HCRI IN CYCLIC IC ENGINES

RELATED APPLICATIONS

This application claims priority to U.S. Provisional Application Ser. No. 60/789,933 filed on Apr. 7, 2006, U.S. Provisional Application Ser. No. 60/865,709 filed on Nov. 14, 2006, U.S. Provisional Application Ser. No. 60/885,279 filed on Jan. 17, 2007, and U.S. Provisional Application Ser. No. 60/892,332 filed on Mar. 1, 2007, the contents of all are incorporated by reference in their entirety.

FIELD

Embodiments relate generally to the common thermo-fluid chemical-kinetics processes involved in an improved controlled initiation and augmentation of the combustion of hydrogen, alcohol, and hydrocarbon fuels and fuel/aqueous-fuel combinations in engines through the use of select radical ignition species.

DESCRIPTION OF THE RELATED ART

The internal combustion ("IC") engine has been a primary source of motive power for nearly eight decades. Thus, while much effort is currently being devoted to the development of new concept engines (electric, fuel cell, hybrid, etc.), more effort is still being aimed at the continued enhancement of the cyclic (reciprocating and rotary) IC engine. Newer to this progression are efforts to co-evolve the "fuel designs" and "engine designs" to better accommodate each other. And most of this work still remains focused around the spark ignition ("SI") and the compression ignition ("CI") modes for the start of combustion ("SOC"). However, despite many related advances, there continue to be penalties and limitations associated with not only the conventional versions of these ignition modes, but also with newer permutations of these two modes. Reasons for these inhibitors flow from the natures of the combustions with these modes.

In conventional SI initiated flame propagation combustion, when a homogeneous mixture of fuel and air is both sufficiently rich enough to sustain a flame and is ignited at a point by a spark, a flame kernel forms and advances from the ignition point as a combustion front. However, this front spreads through the main chamber at its own natural speed, and is thus effectively beyond any further control. Additionally, within this zone (front) of chemical activity, the specific-exothermic power and residence time of the reacting species cannot be controlled. The rapid expansion within this moving combustion zone (due to the release of the exothermic energy) tends to cause its reacting particles to be expelled prematurely (from the moving front). Thus, the rate of combustion is diminished and the combustion is incomplete with undesirable emissions.

In conventional direct injected ("DI") CI the fuel is inserted with an appreciable inlet velocity. Upon entering the combustion chamber, the fuel is atomized into globule sets whose number density is high enough to form clouds of sufficiently densely spaced fuel droplets for the flame to become established around as an envelope. Their fronts are then driven across the compressed air charge by the momentum imparted at spray insertion. The oxygen is completely depleted inside the flame envelopes while fuel is fully consumed at the fronts. The fuel reaches its maximum temperature at the flame fronts, thus stabilizing the process of combustion. However, this also serves to maximize the formation of nitric oxides. Further, the fuel is pyrolized into soot as it approaches the high temperature zones in the absence of oxygen. And as in the case of conventional SI, after the SOC, the combustion in this conventional process is effectively beyond any additional control. Conventional enhancements to this process have been generally limited to the efficacy of the air fuel-mixing.

In both conventional SI and conventional DI CI the ignition process is driven by relatively "higher" temperature chemical-kinetics mechanisms. Depending on the fuel, the chain-initiation reactions responsible for initiating these mechanisms involve either direct fuel oxidation or fuel dissociation. Fuel dissociation can be either due to the higher temperatures themselves (thermal dissociation) or due to third body reactions at (dependent on) the higher temperatures. Thus, in their conventional forms, both of these modes require relatively higher levels of heat to start combustion (compared to levels needed in some of the newer developments). Also, for the combustion initiated by these modes to be sustainable, relatively higher concentrations of the fuel relative to the oxygen are typically required (compared to those required with some of the newer ignition permutations).

In contrast to conventional SI and conventional CI, the process of homogeneous combustion can enable both a lowering of the heat required for ignition and a reduction in the ratio of the fuel to the oxygen required for sustained combustion. Homogeneous combustion entails the simultaneous envelopment of the bulk of the main combustion chamber air-fuel charge during ignition. The combustion event is initiated throughout the entire mixture (i.e., multi-point ignition) and proceeds without visible moving flame fronts. Thus engines employing homogeneous combustion generally behave like compression-ignited stirred chemical reactors. In the process of homogeneous combustion, the chemical-kinetics of the reacting fuel-air mixture is primarily initiated by species concentrations, temperature or combinations thereof. Hereinafter, the chemical inducement of homogeneous combustion via species concentrations is referred to as RI ("Radical Ignition") and inducement by temperature is referred to as TI ("Thermal Ignition"). TI is a CI permutation.

An early example of RI-induced homogeneous combustion is described in U.S. Pat. Nos. 3,092,088; 3,230,939; 3,283,751; and 3,802,827 by Goossak. In Goossak's "LAG" 4-stroke reciprocating IC engine the spark ignition of a fuel-rich mixture in a small pre-chamber is followed by the burning of a fuel-lean mixture in the much larger main chamber. To connect these chambers Goossak's low-temperature ignition engine makes use of a small channel. This channel tears and quenches the burning gases emitted from the pre-chamber so that the flame is not passed. Rather only a mass jet of non-burning incomplete combustion products is transmitted to the main combustion chamber. Under certain operating conditions the combustion is then seen developing simultaneously in the bulk of the air-fuel charge of the main combustion chamber from the many small kernels of products induced by the turbulent wakes of the pre-chamber mass jet. At such operating conditions this multi-point ignition follows from the virtually quasi-homogeneous dispersion of these kernels.

It is the high chemical activity induced by intermediate species and radicals such as $CH_3$, $H_2O_2$, $CH_2O$, $C_2$, $CH$, and $H$ (produced by the incomplete combustion of a rich mixture in the pre-chamber) coupled with high turbulent intensity levels (generated by the mass jet) that together produce early ignition and rapid combustion in the main combustion chamber of the LAG engine. Though not all of the species responsible for the stratified-charge homogeneous combustion in the LAG engine are radicals, since Goossak and hereinafter, RI is understood to mean autoignition induced primarily by the presence of highly-reactive intermediate species and/or radicals (together called "RI species"). Unfortunately, because it is dependent on fluid-dynamic dispersion of the product kernels in the same cycle, the LAG engine could only be made to operate effectively over a limited portion of the overall engine-operating regime.

Blaser, et. al., discovered a different approach to RI. Follow-on work to this approach has lead to several practical 4-stroke reciprocating IC engine designs (U.S. Pat. Nos. 4,898,135; 5,862,788; and 6,178,942)). This approach enables RI species generation in one cycle for use in the next in a manner that overcomes the dispersion limitations of the LAG engine. In a recent example called the SCS ("Sonex Combustion System") the same dominant effects found in low-temperature ignition in the LAG engine are created by this piston micro-chamber configuration: namely "RI species" and intense turbulence. Unfortunately, this technology has disadvantages. One is that it can only provide average overall engine operating-regime optimizations for simultaneous engine efficiency improvements and emission reduction. Because it must typically be optimized for an engine's overall operating-regime conditions, this piston-based technology produces too many radicals during high loads and not enough radicals during low loads. To compensate, the engine controls must then over-adjust the fuel injection timings to achieve desired SOC timings. Consequently, at high loads, the injection timings must be too late for adequate mixing of the fuel, degrading the degree of homogeneity of the combustion and increasing the production of CO and other pollutants. Thus, it cannot take advantage of the fall potential of RI at all points in the engine's operating regime. At some operating points it actually lowers engine performance.

Turning to TI, an early example of is attributed to Noguchi, et. al., in U.S. Pat. No. 4,317,432. This patent describes a low-temperature self-ignited combustion process in a gasoline 2-stroke reciprocating IC engine called Toyota-Soken ("TS") combustion. In this TI variant the intake-exhaust port design creates an overlap between the leaving burned gases and entering fresh charge. This allows for the transfer of heat (and also the carry-over of some chemically active products) to the cold fresh charge. Some characteristics of the TS combustion mimic those of the prior art LAG and SCS engines. Developed around the same time, the ATAC (Active-Thermo-Atmosphere Combustion) engine also involves essentially the same TI phenomena as TS (SAE Paper No. 790501 [Onishi, et. al.]). Though radical involvement is highlighted in advancements to this engine type by Ishibashi and Asai (SAE Paper No. 980757 and U.S. Pat. No. 5,697,332), in comparison to the overall radical activity in the LAG and SCS engines, such activity has been found to be minimal in the TS and ATAC engines. Further, in contrast to the SCS engine, there is no carry over of RI species in these engines from one cycle to the next. Thus today TS and ATAC are classified together with the family of homogeneous-charge compression-ignition (HCCI) engines. HCCI is TI and thus a CI permutation.

Najt and Foster (SAE Paper No. 830264) extended the use of the thermal energy of the exhaust gases to cause TI homogeneous combustion in 4-stroke reciprocating IC engines. Their work and more recent numerical calculations with EGR (SAE Paper No. 2001-28-0048 [Blank, et. al.], which is incorporated by reference) together confirm that the TI induces a homogeneous burn through thermal heating of the charge and oxygen dilution. Additionally, the main "RI species" found responsible for autoignition inducement in the LAG and SCS engines are not found in the EGR TI combustion exhaust gases of this more recent computational study. Thus RI species are not involved in the 4-stroke HCCI variants. Various other names for HCCI combustion include premixed charge compression ignition ("PCCI") and compression-ignited homogeneous charge ("CIHC").

Much more work has been subsequently conducted to extend the applicability of TI in both 2-stroke and 4-stroke reciprocating IC engine applications. However, at certain operating conditions in the PCCI engine there are as yet unresolved problems. The combustion starts in the HCCI engine by way of compression induced "low" temperature fuel-$O_2$ chain-initiation reaction induced self-ignition. Because the fuel-air charge mixture is formed well before top dead center ("TDC"), ignition can occur at various times during the compression process. Thus, as the engine load increases, ignition timing tends to advance and the rate of combustion tends to increase. Additionally, due to early heat release before TDC the thermal efficiency may decrease, and due to the faster and earlier combustion the engine's operation may become rough. Conversely, when the load decreases, ignition timing tends to be retarded. This may eventually result in misfire, as well as in an increase in emissions. Further, when the engine speed is increased, since the time available for the low-temperature preliminary reactions of the diluted mixture becomes less, the time for the main heat release is retarded. In this case, if the time available becomes insufficient, missing may also occur.

These PCCI problems can be looked at from the viewpoint of the compression ratio ("CR") instead. There is one CR where autoignition (via CI) for a given set of starting conditions with a particular fuel will occur. If that CR (hereinafter called the "effective-charge CR") is the same as the "mechanical compression ratio of the engine", then combustion will occur at the "right" time, i.e., typically with combustion initiation talking place when the piston is at TDC and with peak cylinder pressure occurring generally within 10 degrees of crank angle. However, if the effective-charge CR (the autoignition CR) is lower than the mechanical CR of the engine, then combustion will start before piston TDC and the engine will knock unacceptably. If the autoignition CR is higher than the mechanical CR of the engine, then a misfire will occur and the engine will not operate. Therefore, the primary limitation of TI is the absence of an acceptable means of controlling the initiation of premixed HCCI and SCCI (stratified charge CD) (collectively PCCI) over the possible range of operating conditions (including fuel cetane or octane values, ambient temperatures, loads, engine speeds, etc.) necessary for a practical engine.

More work has also been conducted to extend the use of the RI mode. Based closely on the thermo-chemical features of the LAG concept, Oppenheim, et al., developed the Pulsed Jet Combustion (PJC) ignition system and later a second system called the Jet Plume Injection and Combustion (JPIC) system (U.S. Pat. Nos. 4,924,828; 4,926,818; 4,974,571; and 5,271, 365; and SAE Paper Nos. 2000-01-0194 and 2000-01-0199). However, in their JPIC system, combustion control relies both on reactant composition and fluid mechanics and thus suffers the same restrictions found in the LAG engine.

A catalysis based extension of the LAG concept is the prior art called Smartplugs (U.S. Pat. Nos. 4,977,873; 5,109,817; 5,297,518 and 5,421,299). The smartplug insert provides the same effect as a spark ignited fuel-rich pre-chamber, but without the added complexity of a pre-chamber fuel supply. However, instead of trajecting incomplete combustion products via a mass jet, this is primarily a form of TI, projecting thermal energy via a flame jet. Thus the Smartplug does not involve RI and its advantages are primarily limited to premixed charge applications with their lower thermal efficiency potentials Two recent efforts to generate incomplete combustion products outside the engine combustion cylinder for immediate use in augmenting combustion control in the cylinder are noted in U.S. Pat. Nos. 6,092,512 and 6,345,610. While these both enable the tailored use of metered amounts of incomplete combustion products appropriate to each engine operating condition, the first relies on varying exhaust gas conditions and the second is simply the LAG concept itself moved to the intake manifold. These cannot be effective in high speed and load situations. Thus neither is capable of providing the control needed to make homogeneous combustion occur and work over the entire engine-operating regime. Since these, a dual-mode approach has been suggested that incorporates the LAG technology at only light loads (see U.S. Pat. No. 6,595,181). From this brief overview, several things become apparent. Primarily only RI and the TI variant (of CI) are capable of producing homogeneous combustion in IC engines. However, effective TI prior art is limited both to premixed fuel applications (and thus to lower efficiencies) and to operations over only limited portions of the engine operating regime. Whereas DI-fuel insertion IC engine variants provide higher efficiency potentials and are not engine operating regime limited, they are unfortunately not capable of homogenous combustion operations. In conventional RI engines, the only variant shown capable of single mode homogeneous operations over the entire engine operating regime with DI of the fuel is the SCS engine. However, the exercise of control over the combustion in this RI variant is far too limited, and within certain portions of the engine operating regime this variant actually degrades combustion.

SUMMARY

An embodiment relates generally to a method for controlling a reduction in required heat and required fuel concentrations relative to oxygen concentrations for an ignition of a fuel within a main combustion chamber of an engine. The method includes providing a plurality of radical ignition species generated in at least one prior combustion cycle in a secondary chamber associated with the main combustion chamber of the engine, where the plurality of radical ignition species is generated by at least one OH-radical ignition species driven chemical kinetic mechanism. The method also includes directing a portion of the plurality of radical ignition species to the main combustion chamber. The method further includes regulating an accumulation of the portion of the radical ignition species and a generated radical ignition species of the main combustion chamber to modulate an ignition event for fuel in the main combustion chamber Another embodiment pertains generally to a process for chemically modulating combustion of a fuel within an engine using a predetermined amount of a plurality of radical ignition species. The process includes providing at least one secondary chamber connected by at least one conduit to a variable volume main combustion chamber and directing the predetermined amount of the plurality of radical ignition species generated at least in part in at least one previous cycle within the engine to the variable volume main combustion chamber to mix with a new air charge of the variable volume main combustion chamber prior to an end of a main-compression event. The process also includes trapping a second portion of the variable volume main combustion chamber air and the fuel in at least one secondary chamber during the main-compression event and using the predetermined amount of the plurality of radical ignition species in the variable volume main combustion chamber to act as an agent to first activate a pre-ignition event of the fuel by driving a pre-ignition chemistry involving fuel decomposition via radicals and to then initiate a start of an ignition chemistry of an ignition event that drives fuel decomposition via OH. The method further includes using peaked pressures generated by the ignition event and a combustion of the fuel to drive OH and energy from the variable volume main combustion chamber into at least one secondary chamber. The method yet further includes using OH and an energy transferred from the variable volume main combustion chamber and a second plurality of radical ignition species resident in the secondary chambers to drive an OH-radical species driven fuel decomposition sub-mechanism or plurality of OH-radical species driven fuel decomposition sub-mechanisms in at least one secondary chamber for a generation of additional radical ignition species.

Yet another embodiment relates generally to an apparatus in an internal combustion engine including a cylinder, where the cylinder further comprising at least one variable volume combustion chamber defined by a work-power producing component moving within a space bounded externally by a cylinder housing. The cylinder is configured to periodically receive a fuel and an air charge and to implement a combustion cycle comprising an intake, main-compression, combustion, power-expansion and exhaust portions phases. The apparatus includes at least one mini-chamber arranged about the cylinder housing of the cylinder in proximity with the at least one variable volume combustion chamber, where the at least one mini-chamber is configured to serve as origination sites for a generation of a plurality of radical ignition species. The apparatus also includes at least one connecting conduit configured to couple the at least one mini-chamber with an associated the at least one variable volume combustion chamber, where the at least one connecting conduit is also configured to allow flow of the plurality of radical ignition species, the air, the fuel and chemical reaction products in and out of the at least one mini-chamber during various phases of the combustion cycle. The apparatus further includes at least one controller associated with the at least one mini-chamber configured to regulate an amount of the plurality of radical ignition species provided to the at least one variable volume combustion chamber based upon load and speed requirements applied to the engine.

BRIEF DESCRIPTION OF THE DRAWINGS

Various features of the embodiments can be more fully appreciated, as the same become better understood with reference to the following detailed description of the embodiments when considered in connection with the accompanying figures.

FIG. 1 describes a generalized HCRI thermo-fluid chemical-kinetics process in accordance with HCRI process 100.

DETAILED DESCRIPTION OF EMBODIMENTS

Figure 2A:
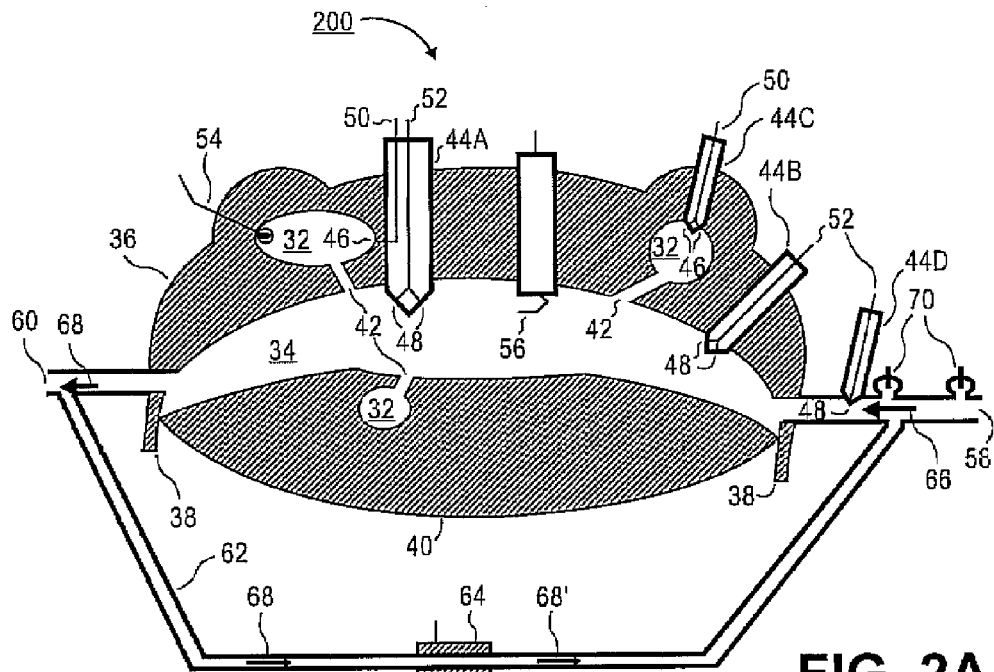
FIG. 2A is a composite schematic diagram of single engine combustion cylinder of an exemplary HRCI engine 200 utilizing the HCRI process 100 shown in FIG. 1.

For simplicity and illustrative purposes, the principles of the present invention are described by referring mainly to exemplary embodiments thereof However, one of ordinary skill in the art would readily recognize that the same principles are equally applicable to, and can be implemented in, all types of combustion engines, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

An embodiment generally relates to an ignition control process. More particularly, the ignition control process is a thermo-fluid chemical-kinetics procedure configured to provide exacting control over the RI species initiation of homogeneous combustion and of near homogeneous combustion in cyclic IC engines using various hydrogen, alcohol and hydrocarbon fuels and fuel/aqueous-fuel mixtures. The ignition control process achieves this exacting control by making use of RI species, i.e., radicals and highly-reactive intermediate species, to "dominate" ignition and combustion in cyclic IC engines. Autoignition under such conditions can be referred as being via a radical ignition ("RI") mode.

Other embodiments pertain to regulating combustion in the cyclic (reciprocating piston and rotary) IC engines in a manner that can be tailored to any point in an engine operating regime. These other embodiments can be implemented as a cyclic IC engine modified to use the ignition control process. In addition to single-ignition mode engines using RI, embodiments of the ignition control process can also augment SI and CI within a multitude of additional cyclic IC engines. These RI species augmentation IC engines use the RI species to "assist" (rather than dominate) ignition and combustion in modified forms of the conventional IC that make primary use of these older ignition modes. In all three ignition mode cases the use of the ignition control process can enable improved combustion with increased efficiencies and decreased overall emissions.

In comparing the chemical-kinetics mechanisms responsible for the SOC via RI with the general mechanisms associated with the SOC via the other ignition modes, the TI ("thermal ignition") permutation of CI mode serves as a good reference point. The SOC with premixed fuel TI generally occurs at "low" temperatures compared to the "higher" temperatures typically associated with both DI CI and SI. Additionally, the chain-initiation reactions responsible for TI at the "low" temperatures are most typically fuel-oxidation reactions. In contrast the controlled RI process occurs at "lower" temperatures relative to the "low" temperatures of TI. Also, the chain-initiation reactions responsible for RI primarily involve RI species $H_2O_2$ and $HO_2$ rather than fuel-$O_2$ reactions. Further, the RI species based chain-initiation reactions responsible for RI at the "lower" temperatures are typically much faster than the fuel-oxidation based chain-initiation reactions responsible for TI at the "low" temperatures.

Further more, the dominant fuel-$O_2$ chain-initiation reactions of TI are highly affected by the air to fuel ratio. On the other hand, because it is based on a very different mechanism, the dominant chain-initiation reactions responsible for RI are far less dependent on the air-fuel ratio. Instead, the dominant RI chain-initiation reactions depend much more on the strength of presence of the RI species. These TI and RI comparisons apply to both the DI-fuel and the premixed-fuel sub-cases of homogeneous combustion RI ("HCRI"). Moreover, because this strength of presence is made a controllable commodity by the ignition control process, this new process invention is capable of enabling a deeper mining of the priceless potential of the prior art associated with both the SI mode and the permutations of the CI ignition mode for both the premixed and DI fuel cases.

The IC engine embodiments of the ignition control process contain one or more engine combustion cylinder(s) with means to facilitate a cyclic repetition of main-compression, main-combustion, power-expansion, exhaust and intake events common to the general family of rotary and reciprocating piston IC engines of the field. Unique to these engines are stationary secondary RI species generation chambers located in the vicinity of the primary combustion chambers of the cylinders. In 2 and 4 stroke reciprocating engines, these secondary chambers (called mini-chambers) can be located in or near the cylinder heads and/or the cylinder liners that together with the pistons surround (and thus define) the primary combustion chambers (called main chambers). In rotary combustion engines, these mini-chambers are typically located in functionally equivalent locations within or near the cylinder housing periphery that together with the rotor define the various primary (main) chambers.

These mini-chambers ("M-C's") are coupled with the primary chambers via conduits. The conduits are sized so that the flows between the M-C's and main chambers are throttled at most all-operating speeds of the IC engines embodiments. The sizes of the conduits are also configured to quench the flames within the conduits before reaching the M-Cs during a main combustion event. The M-C's and their conduits can also be located in moving portions of the cylinder (e.g., the piston or rotor).

These embodiments are configured to include control devices that are coordinated both with the RI species production in the M-C's and with the other processes that follow from this M-C production. These control devices enable regulation of the overall production and or the overall conveyance of the RI species for use in the main chamber in a later cycle. Regulation of the overall production and/or conveyance is dependant on the ultimate quantity of RI species that must be present in a given main chamber during the subsequent cycle to help facilitate the occurrence of the combustion event via RI species in the manner desired and depending on the operating conditions (combined load, fuel, speed etc.) of the engine. Thus, when production control is exercised within some of the stationary M-C's, it is regulated in these chambers in a manner that considers the total amount of RI species generated by all of the M-C's of a cylinder together with any predetermine-able main chamber generation and supplementary generation and any predetermine-able conveyance that will occur afterwards before the start of the next combustion event.

Within the M-C, the RI species are generated naturally via special "OH—RI species" driven fuel-decomposition reactions. The supply of OH for these special fuel-decomposition reactions is the large quantity generated during the main combustion event and transferred to the M-C's during the period of peak main-to-mini chamber pressure induced mass transfer during and immediately following ignition. The overall production levels of this "OH—RI species" driven RI species generation process is primarily influenced by three factors. The first is the relative concentrations of the various species within the M-C. The second is the temperatures of the reacting M-C constituents. The third is the total volume of the M-C's. In the first of these factors, it is primarily the ratios of fuel to OH and fuel to RI species that are most important. These ratios can in turn be partially regulated by adjusting the insertion of a control-fluid into a regulate-able M-C. The second factor can be controlled in part by M-C augmentation devices capable of adjusting the M-C surface or/and interior temperatures. The third can be controlled by devises capable of regulating the volume of the M-C's. Other types of M-C RI species generation-control augmentations are also employable.

At some point in the HCRI cycle, a portion of the newly created RI species resident in the M-C's will typically transition into non-reactive states of "frozen equilibrium" or into very low reactive states of "near frozen equilibrium". A fraction of this portion of the RI species will remain trapped in the M-C's until it can be used to help seed and impregnate a follow-on main chamber gas charge for the purpose of full HCRI or of the RI species augmentation (of SI or CI).

The regardless of the degree of control in regulating the M-C RI species generation process, the subsequent seeding and impregnation of the main chamber with RI species is supported by additional sub-processes that are predictable. Some of these additional sub-processes are also controllable. Starting only a short time after the completion of the main-combustion event, two of the predictable sub-processes occur in the main chamber during the expansion and the exhaust events. In the first, a large portion of the RI species discharged from the M-C's during expansion is retained for a time in the main chamber. During the same period a second RI species generation process occurs in the main chamber that is similar to the earlier M-C RI species generation process. This second generation process occurs because of the mixing of main chamber (main combustion event produced) OH with the M-C gases discharged into the main chamber (during expansion and blow-down).

Much of the RI species involved in these two sub-processes are lost during exhaust. However, between the cycles other controllable sub-processes can be invoked to adjust the retention of these RI species and to further augment the RI species presence in the main chamber. One of the means of further augmentation is additional generation that is driven in part by some portion of the RI species generated earlier. Also, during the exhaust and intake events, control measures can be evoked to further adjust the conveyance of the RI species to the main chamber. In this overall RI species generation and conveyance progression that originates with the M-C's, all of the predictable and regulate-able portions of the ignition control process are coordinated so as to enable a desired presence of RI species in the main chamber.

It is the presence of these RI species within the main chamber charge of the later cycle that enables controllable ignition and combustion. In RI species dominated engines, it is the greater strength in this presence that serves to switch the dominant chain-initiation path to one that occurs at both the "lower" temperatures and at the much faster reaction rates (than typical of the chain-initiation reactions for SI and CI with the same fuel). It is this novel general RI species induced ignition sub-mechanism that makes possible ignition under leaner conditions with less supplied heat. And in RI species augmented engines, the ignition and combustion chemistry is typically a hybrid of this RI species dominated chemistry and the chemistry of the more conventional ignition modes.

The ignition control process is based on the regulation of the RI species generation and conveyance progression that originates with the M-C's in one cycle to affect the ignition and combustion in the main chamber of another cycle. Whether serving in a dominant role or in an augmentation role, the ignition control process can simultaneously lower emissions, raise thermal efficiencies and increase the operating fuel range of the rotary and reciprocating IC engine embodiments of its field. In these IC engines this control process can do all of this for both the premixed and the DI fuel insertion cases. However, the primary achievement of this ignition control process is in making possible single-ignition mode RI with DI under homogeneous conditions (DI HCRI) in a manner that is tailored to the individual operating conditions of the cyclic IC engine.

Figure 2B:
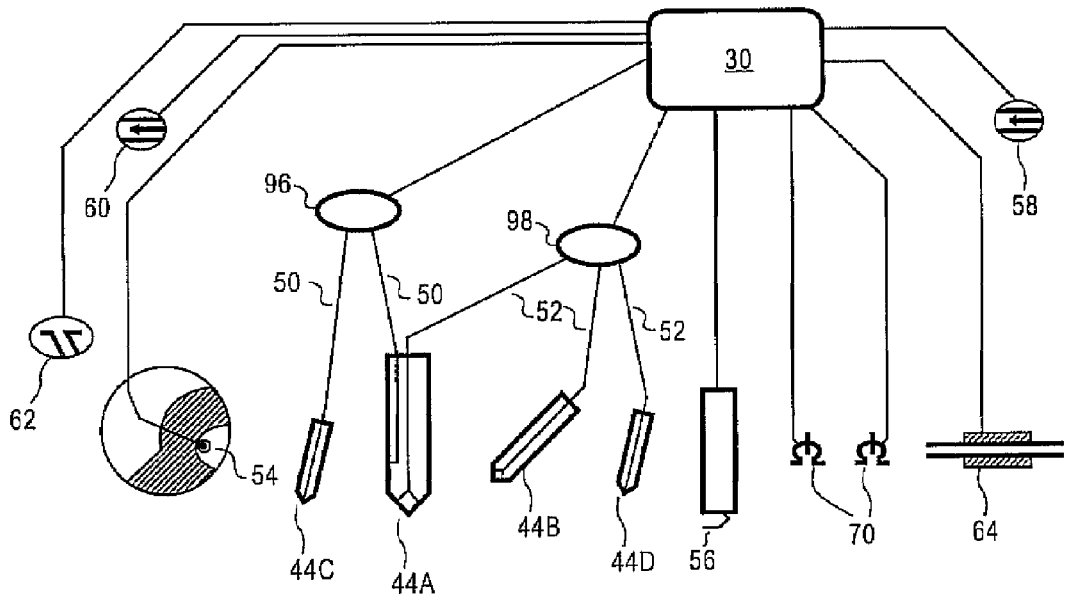
FIG. 2B is a schematic of an exemplary electronic control system for the generalized HCRI engine embodiment shown in FIG. 2A

FIG. 1 depicts an exemplary process flow diagram for a HCRI thermo-fluid chemical-kinetics process 100 (hereinafter HCRI process 100). The HCRI process 100 is a complex series of general events that can occur in internal combustion ("IC"). FIG. 2A-2B illustrate an exemplary HCRI IC engine 200 hereinafter HCRI engine 200) that uses the HCRI process 100 in accordance with another embodiment. Accordingly, the HCRI process 100 is explained in conjunction with FIG. 2A-2B.

The exemplary HCRI engine 200 depicted in FIG. 2A-2B is an abstraction capable of using HCRI process 100 in accordance with a plurality of other possible IC engine configurations. HCRI engine 200 is thus a generalized IC engine embodiment containing common elements with other possible IC engine embodiments employing the HCRI process 100. Discussion of various elements and their relationship to the operation of the HCRI engine 200 are described hereafter.

The HCRI process 100 makes use of radicals and highly-reactive intermediate species which are hereinafter called radical ignition ("RI") species. RI species are hereinafter understood to include $H_2O_2$ (hydrogen peroxide) and $HO_2$ (the hydroperoxyl radical) for hydrogen, hydrocarbon and alcohol fuels and fuel/aqueous-fuel mixtures. In addition, when the fuel molecules of such fuels/fuel mixtures consist of at least one carbon atom (such as the individual fuels methane and methanol), it is hereinafter understood that the RI species may also include $CHO_2$ (formaldehyde). Further, when the fuel molecules of such fuels/fuel mixtures consist of at least two or more carbon atoms (such as the individual fuels ethane, ethanol and fuels with larger molecules), it is hereinafter understood that the RI may also include $CH_3HCO$ (acetaldehyde). Hydrogen, hydrocarbon and alcohol fuel and fuel/aqueous-fuel mixtures are hereinafter called "fuel". Finally, depending on the fuel, it is hereinafter understood that RI species may also include other radicals and highly reactive intermediate species.

In one embodiment, a full HCRI engine is one in which the IC in HCRI process 100 is dominated by RI species. A radical ignition species augmented ("RIS-augmented") engine is one in which the IC in HCRI process 100 is assisted but not dominated by RI species as another embodiment. Hereinafter a main-compression event is understood to start after the completion of the exhaust and intake events. In yet other embodiments, the full HCRI engine that makes use of fuel that is inserted by some means before the beginning of the main-compression event in HCRI process 100 is called a "premixed charge HCRI engine" (or PC-HCRI engine) of HCRI process 100 and the full HCRI engine that makes use of the direct injection ("DI") of fuel that starts sometime after the beginning of the main-compression event in HCRI process 100 is called a "DI-HCRI engine" of HCRI process 100 in accordance to yet other embodiments.

Similarly, the RIS-augmented engine that makes use of Fuel that is inserted by some means before the beginning of the main-compression event in HCRI process 100 is called a "premixed RIS-augmented engine" of HCRI process 100 in some embodiments and the RIS-augmented engine that makes use of the DI of fuel that starts sometime after the beginning of the main-compression event in HCRI process 100 is called a "DI RIS-augmented engine" of HCRI process 100 in other embodiments. Depending on whether the dominant ignition mode employed is spark ignition ("SI") or compression ignition ("CI"), each of these HCRI process 100 RIS-augmented fuel insertion options (premixed and DI) have sub-options associated with them. Thus there are four basic RIS-augmentation embodiments of HCRI process 100. These involve RIS-augmented PCCI, RIS-augmented PCSI, RIS-augmented DI CI, RIS-augmented DI SI.

A cycle of HCRI engine 200 consists in part of an intake event, a main-compression event, a main-combustion event, a power-expansion event and an exhaust event. Depending on the embodiment of HCRI engine 200, some of these events may co-occur.

As shown in FIG. 1, event 1 105: HCRI process 100 starts and ends with RI species from a previous cycle being conveyed to the present cycle. These are carried over to the present cycle within/by both a main chamber 34 or plurality of main chambers and a mini-chamber ("M-C") 32 or plurality of mini-chambers ("M-C's") (FIG. 2A).

At the start of the new cycle the bulk of the RI species in both the main chamber 34 and the M-C's 32 are typically in states of "frozen equilibrium" (or "near" frozen equilibrium). The RI species then typically remain non-reactive at the relatively lower temperatures prevalent early in the new cycle. In RI applications, a specie is in the state of frozen equilibrium when it has a chemical-reaction rate of zero. The full meaning and implications of "frozen equilibrium" relative to RI is discussed in SAE Transaction Paper No. 2004-01-1677 (Blank), which is incorporated by reference.

During this period, a plurality of exhaust gases 68 depart the main chamber 34 via a general exhaust-gas device 60 and a plurality of intake gases 66 enters the main chamber 34 via a general intake-gas device 58. Depending on the volumetric and mixing efficiencies of the overall exhaust-intake event process, most of the main chamber RI species contained in the exhaust gases 66 are expelled from the engine.

When there is recycling of the exhaust gases 68 via a general exhaust-gas recycling device (system) 62, additional quantities of RI species are either retained internally in the main chamber 34 or returned to the main chamber's 34 with the intake gases 66. The quantity of RI species returning with the intake gases 66 may be adjusted by a general exhaust-gas RI-species augmentation device 64 or plurality of exhaust-gas RI-species augmentation devices 64 (resulting in a plurality of modified exhaust gases 68'). Also, the quantity of RI species returning with the intake gases 66 may be adjusted by a general intake-gases RI-species generation-control augmentation device 70 or plurality of intake-gases augmentation devices 70.

When the IC engine uses premixed fuel (be it for the PC-HCRI or one of the premixed RIS-augmentation engines of HCRI process 100), fuel can be inserted into the intake gases 66 in the general intake-gas device 58 by a general intake-gas entry device fuel insertion device 44D via fuel-insertion orifices 48. The fuel is distributed to the intake-gas fuel insertion device 44D via a fuel supply distribution system 98 (FIG. 2B) through at least one fuel supply line 52. The amount fuel supplied to the intake-gas fuel insertion device 44D is regulated by a portion of the engine electronic control system 30 that controls the fuel supply distribution system 98. The amount of fuel provided and the timings of fuel insertion are in accordance with HCRI engine 200 operational requirements.

Naturally occurring pressure differences between the chambers cause some of the RI species carried over in each of the M-C's 32 to transfer to the main chamber 34 through at least one connecting conduit 42 where they are then mixed with retained gases and the intake gases 66 along with any recycled exhaust gases 68 and 68'. The manner of the mixing can vary with the operational requirements of the engine being used.

In event 2, 110, by a time somewhere in the middle of the compression event, the gases ("gas charge") in the main chamber 34 have become highly impregnated with RI species from the previous cycle(s).

In event 3 115, as compression of the gases in the main chamber 34 continues, the mix of the RI species and the main chamber gases becomes more homogeneous This main chamber compression causes pressure rises and pressure induced temperature rises. With these temperature rises, the activity of the RI species in the main chamber 34 begins to increase. Also, pressure differences form between the main chamber 34 and M-C's 32 and a throttling of the gases being transferred into the M-C's 32 typically occurs in the conduits 42. The throttling in turn causes the pressure differences between these chambers (32 and 34) to further build, causing a high-speed mass jet or a plurality of high speed jets (one jet per conduit 42) to form. These jets transfer ("force") portions of the main chamber gases (including intake air) into the M-C 32, renewing the M-C's air (and thus oxygen) supply. If there is premixed fuel within the intake gases 66, fuel also enters the M-C's 32 through the conduits 42 via the mass jets.

In event 4 120, when there is DI of the fuel (as in the DI-HCRI and DI-RIS-augmentation engines of HCRI process 100), the timing of the start of injection ("SOP") of the fuel into the main chamber 34 is typically during the mid-to-late portion of the main-compression event. In this case, the fuel is inserted into the main chamber 34 by either a main chamber fuel sub-component or sub-components of one or more multi fluid insertion device 44A and/or by a single main chamber fuel insertion device 44B or plurality of single insertion devices 44B via (for all such insertion devices 44A and 44B) at least one fuel-insertion orifice 48. The fuel is distributed to the insertion devices 44A and 44B for use in the main chamber's 34 via the fuel supply distribution system 98 through the fuel supply lines 52. The amount of fuel supplied to each of theses insertion devices 44A and 44B is regulated by the portion of an engine electronic control system 30 that controls the fuel supply distribution system 98. The amounts of fuel provided and the timings of fuel insertion are in accordance with HCRI engine 200 operational requirements.

For DI-HCRI engines of HCRI process 100, the timing of the start of this DI fuel insertion is characteristically early relative to the desired timing of ignition (compared to conventional DI diesel engine operations). For these embodiments, the SOI and EOI ("end of injection") are timed so that injection is completed adequately before the start of combustion ("SOC"), and so that the autoignition (SOC) does not begin until just a little after a movable work-power producing component's 40 passing of top dead center ("TDC") (where TDC is a position of the movable work-power producing component 40 that makes the volume of the main chamber 34 a minimum). This allows time for the fuel to eventually become mixed more thoroughly with the RI species laden main chamber gas charge in at least a quasi-homogeneous layered manner. In DI applications, some of the injected main chamber fuel can enter the mass jets of M-C's 32 by both diffusion (within the main chamber gas charge) and by incidental convection. This fuel is accordingly entrained by these mass jets into the M-C 32 via the conduits 42 and trapped.

In event 5 125, in DI-HCRI embodiments of HCRI process 100, with all of the main chamber fuel being inserted early relative to the SOC (compared to conventional DI CI), well-stirred fuel conditions are also generally assured. Even under higher load conditions, by some time prior to "after TDC" autoignition, the mixing of the main chamber fuel-air gas charge to at least quasi-homogeneous levels is typically assured in DI-HCRI embodiments of HCRI process 100. However, as in the LAG engine under the influence of RI species domination, RI homogeneous combustion can occur even when the fuel-air gas charge is slightly-moderately stratified (SAE Transaction Paper No. 2004-01-1677 [Blank]). These assurances follow from two factors: the longer than normal mixing times available because of the presence of the RI species and the much higher than typical turbulence levels.

The first of these factors, the longer than normal mixing times available, is a result of the presence of the RI species. Their presence makes possible either much lower compression ratios ("CR's") or ultra-fuel lean operations. When the CR is much lower (than in "functionally equivalent" conventional CI engines), DI fuel insertion can be earlier when HCRI engine 200 is operated under moderately lean conditions. Thus the directly injected fuel can be effectively mixed to the point of homogeneity. Alternatively, when the CR is only moderately lower, the HCRI engine 200 can be operated under very lean conditions and fuel insertion can once more be earlier and again homogeneously mixed. Depending on the load and engine speed, there are conditions higher load and speed) that necessarily require less lean operations. Under such conditions, RI species generation is accordingly reduced so that the fuel insertion can still be early relative to the desired point of autoignition.

The second of these factors, the much higher than typical turbulence levels maintained in HCRI engine 200, can have multiple causes. However, universal to all HCRI engine embodiments is the intense turbulence generated by the M-C's 32. Reasons for the intensity of this turbulence generation are given in SAE 2007-01-0047 [Blank], SAE 2007-01-0135 [Blank] and SAE 2007-01-1254 [Blank].

In event 6 130, in both the DI and premixed fuel cases, because of the high turbulence and the presence of the RI species, even at the relatively "much lower" than "normal" temperatures present in the main chamber (than are needed for conventional IC engine pre-ignition activity), typically sometime before the end of the main-compression event, the main chamber RI species, fuel and air begin significant pre-ignition activity. Depending on the characteristics of the fuel, the operating conditions and specifications of the IC engine embodiment, this activity can often even start a little earlier in the main-compression event.

Figure 3:
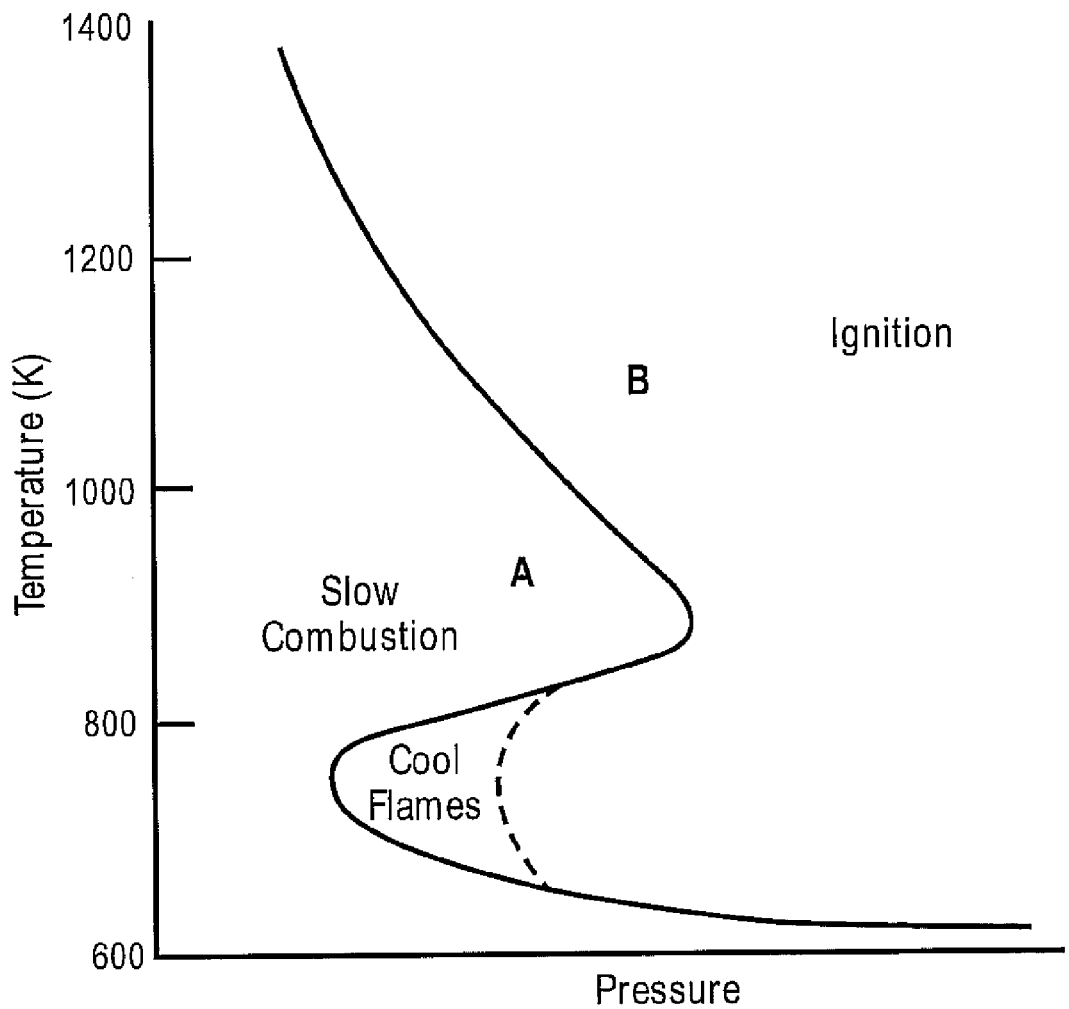
FIG. 3 is a plot depicting general ignition limits for hydrogen, alcohol and hydrocarbon fuels.

Typically during these periods of the cycle, the state of the fuel-air gas charge in the main chamber 34 is transitioning the through the "Slow Combustion Region" shown in FIG. 3. This figure for the general ignition limits for fuel is based on Semenov's peninsula of low temperature ignition limits (Semenov, N. N., *Some Problems in Chemical Kinetics and Reactivity*, Princeton University Press, 1958).

For either a hydrogen molecule or a smaller molecule alcohol or a smaller molecule hydrocarbon as F, in the pre-autoignition chemistry leading up to RI and RIS-augmented ignition, the following chain-initiation reaction set:

$$\sum_{j}^{N_j} \{F + HO_2^- \rightleftharpoons R_j^- + H_2O_2\} \quad (1)$$

contains some of the reactions that are among those playing a dominant role, where $R_j^-$ are molecules with one less H than F. For example, with ethanol there are two dominant reactions in the set ($N_j=2$), for which $R_j^-$ are $CH_3CHOH$ and $C_2H_4OH$ (SAE Paper No. 2007-01-0623 [Blank], which is incorporated by reference in its entirety). It is noted that this reaction set results in a build-up of the highly reactive intermediate species $H_2O_2$.

In addition to this set, the general "$H_2O_2+M$" chain-initiation reaction dominant during autoignition (Equation (2)) (and thus described later) and the chain-branching OH-fuel decomposition reaction set dominant during autoignition (Equation (3)) (and thus also described later) are both typically among the other dominant reactions in operation during pre-autoignition. These and the other dominant pre-autoignition reactions occurring during this same period of the cycle result in the slow build up of the RI species. Though the dominant pre-autoignition chain-initiation and chain-branching mechanisms become more complex with a larger hydrocarbon or a larger alcohol molecule as F, the same principles apply, with the role of the hydroperoxyl radical ($HO_2^-$) (in the chain-initiation reaction decomposition of the fuel) and the role of the hydroxyl radical ($OH^-$) (in the chain-branching reaction decomposition of the fuel) both dominant during the pre-ignition activity.

In general, these general $HO_2^-$ and $OH^-$ driven "much lower" temperature sub-mechanisms represent direct fuel decomposition at very low temperatures, setting the stage for "lower" temperature self ignition by the RI species (RI) in the full HCRI engines of HCRI process 100 (DI-HCRI and PC-HCRI) and for ignition assistance in the RIS-augmented engines of HCRI process 100.

This description also applies to dual-fuel (and multi-fuel) insertion operations in which the re-activities with $HO_2^-$ and $OH^-$ of all the constituents (of the fuel) are compatible. In such cases, the general mechanism is similar, with the dominant reactions for each constituent being of the same form (with of course their own F, $R_j^-$ and other species) (SAE Paper No. 2007-01-0047 [Blank]). In operations in which the re-activities of the various constituents of the fuel with $HO_2^-$ and $OH^-$ are not similar, typically at least initially, the general reaction sub-mechanisms follow the activity of the constituent whose reactivity with the more significant of either $HO_2^-$ or $OH^-$ is dominant (depending in absolute terms on which radical is decomposing which of the constituents the fastest during pre-autoignition).

In HCRI process 100 the RI species from past cycles and the RI species created during this "much lower" temperature pre-ignition activity are subsequently used together in one of three ways in the main chamber IC: (1) to dominate and thus initiate autoignition (RI) in full HCRI engines; (2) to augment the efficiency of and maintain better control over the timing of autoignition (CI) in RIS-augmented PCCI and in DI CI engines; and (3) to augment the efficiency of spark ignition (SI) in RIS-augmented PCSI and DI SI engines. In the two full HCRI cases (DI-HCRI and PC-HCRI), because of the presence of the R species, there is exothermic pre-ignition activity that is slowly (at first) carrying the fuel-air gas charge down a predetermined chemical-kinetics path (dependent on many factors) to RI species induced autoignition. In the four RIS-augmented cases, the activity levels during this same period will not be as high, but will however be higher levels (depending on the degrees of augmentation) than in the conventional (non RIS-augmented) variants of these cases.

Returning to FIG. 2A, the exterior casing of HCRI engine 200 of consists of a "top" housing" periphery 36 and a "side" housing periphery 38 (or plurality of side housing peripheries 38). Starting generally at a time in the cycle that is late in the main-compression event, a control fluid can be inserted into one or more of the M-C's 32 mounted in these top and/or side housing peripheries 36 and 38. Insertion is by either a single RI-species generation control-fluid insertion device 44C or by a control fluid sub-component of the multiple or the dual-fluid insertion device 44A. Actual insertion into the M-C's 32 is through one or more M-C RI-species generation control-fluid insertion orifice 46. The control fluid is distributed to the insertion devices 44A and 44C for use in theses M-C's via a mini-chamber RI species generation control fluid supply distribution system 96 through at least one M-C RI species generation control-fluid supply line 50.

It is not necessary that the same control fluid or the same quantity of control fluid be inserted into each of the M-C's 32 using control fluids. In the three DI engine types of HCRI process 100 the control fluid is typically fuel, though not necessarily the same fuel as used in the main chamber 34. On the other hand, in the three premixed engine types of HCRI process 100 the control fluid is typically air or some other fluid that can help dilute the fuel concentrations of the M-C 32. The amount of control fluid inserted into each of the M-C's 32 is tailor measured to insure that a correct total quantity of RI species can be generated by all of the M-C's 32 to either assist in or dominate the ignition of the main chamber(s) 34 of later cycles. The amount sent by the control fluid supply distribution system 96 for each M-C 32 is regulated by another portion of the engine electronic control system 30. Generally, at higher loads (when more main chamber fuel is needed), fewer quantities of generated RI species are required for main chamber ignition and vice versa. This applies in the application of HCRI process 100 to all of the various full HCRI and the RIS-augmented cases.

In addition to the use of control fluid, there are a number of additional augmentations that can be used to effect the RI species generation process in the housing periphery mounted M-C's 32. Variable cooling control of the M-C 32 assemblies by direct means is effective in assisting in the direct control of the M-C RI species generation process in these chambers. Other control augmentations include catalytic surfaces and devices (including ones where the catalytic surface areas can be varied), fuel reformatting devices, chemical additive insertion devices, heating-cavity devices (example: via rapid electrical current discharges, etc.), rapid plasma generation devices, rapid ultraviolet-light discharge devices, microwave devices, rapid cooling/heating devices, M-C volume changing devices, M-C pressure regulating devices, M-C flow varying devices, M-C geometry varying devices, M-C connecting conduit geometry varying devices, M-C connecting conduit flow varying devices, M-C conduit entering-fuel regulating devices, etc. Devices such as (but not limited to) these can all be used to play a part in the control of RI species generation in M-C's (and to help indirectly control RI species generation in the main chamber's later on in the cycle). All such devices are together represented in FIGS. 2A-B as one or more general mini-chamber RI-species generation-control augmentation device 54.

Any M-C 32 receiving control-fluid or fitted with and operationally employing RI-species generation-control augmentation device 54 are also considered "control-active." These are also regulated by a portion of the engine electronic control system 30 (FIG. 2B) that controls their functions in accordance with HCRI engine 200 operational requirements.

In event 7 135, in fill HCRI embodiments of HCRI process 100 self ignition (RI) is dominated by RI species. Thus, the general chemistry for these embodiments is highly definitive. Also, all of the CI and SI RIS-augmented engines of HCRI process 100 share this definitive general chemistry as a common feature. In addition these RIS-augmented engines retain elements of the "un-augmented" chemistry associated with their own conventional characteristics. The degree to which these RIS-augmented engines employ the definitive general chemistry of full HCRI is related to the degree of RI species augmentation ("RIS-augmentation").

Thus HCRI process 100 is defined in part by the common features representative of this definitive chemistry for event 7 135 are herein described. For comparison purposes, the portion of the "un-augmented" chemistry associated with the conventional aspects of the RIS-augmented embodiments are presented later (within the specific individual discussions of the general distinctives of these HCRI process engines of HCRI process 100).

In full HCRI engines, the ignition process is dominated by sub-mechanisms involving fuel-OH decomposition chain-branching reaction sets at "lower" temperatures. This is in contrast with the more traditional "low" temperatures direct-$O_2$ fuel oxidation chain-initiation chemical-kinetics mechanisms typically found for the same fuel in conventional PCCI. This is also in contrast to the "higher" temperatures associated with combustion of the same fuel in conventional SI and DI CI. The chain-initiation reaction mechanisms of conventional SI and DI CI typically involve dissociation (thermal and/or via third body) reactions or and direct fuel-$O_2$ decomposition reactions.

In the general case of homogeneous combustion RI with the fuel (hydrogen, alcohol, hydrocarbon fuels and fuel/aqueous-fuel mixtures), the OH needed to sustain the 'lower' temperature fuel-OH decomposition sub-mechanisms is primarily generated by dominant chain-initiation reaction:

(where M is a third body species and can thus be one of a number of species). This general RI chain-initiation reaction is significantly faster than the general fuel-$O_2$ chain-initiation oxidation reaction sets typical of conventional "low" temperature premixed charge compression ignition of conventional HCCI. For example, the forward rate constant for this $H_2O_2+M$ reaction is more than $10^5$ times faster at 1050 K than the forward rate constant for the dominant chain-initiation reaction for the premixed CI (HCCI) of methane at 1200 K (SAE Paper No. 2007-01-0047 [Blank]).

For the case of either a hydrogen molecule or a smaller molecule alcohol or a smaller molecule hydrocarbon as F, a $OH^-$ quantity generated by this universal HCRI process 100 chain-initiation reaction (Equation (2)) is in turn used in the general dominant chain-branching reaction set:

where $R_i^-$ are molecules with one less H than F. For full HCRI with ethanol as an example, F is $C_2H_5OH$ and the various $R_i^-$ molecules are $CH_3CH_2O$ and $CH_3CHOH$ (SAE Paper No. 2007-01-0623 [Blank]).

The general fill HCRI autoignition event is also dominantly influenced by the available concentrations of the other key RI species. Though the sub-mechanisms for all of this can be rather complex (and thus more difficult to generalize), the other RI species also help in accelerating $OH^-$ generation during autoignition (as they did during pre-ignition). This in turn helps to "drive" more fuel decomposition via the dominant fuel-OH chain-branching reaction set (Equation (3)). Once a molecule of fuel is OH-decomposed, some of the $R_i^-$ molecule products of this set can be directly decomposed further by $O_2$ at these lower temperatures. Though the dominant autoignition chain-branching mechanisms become much more complex with a larger hydrocarbon or a larger alcohol molecule as F, the same principles apply, with the role of the hydroxyl radical ($OH^-$) remaining dominant in the fuel decomposition until much (if not most) of the fuel is expended.

There are several reasons why this autoignition activity (dominated by reaction Equation (2), reaction set Equation (3) and the other RI species driven reactions) can start at temperatures that are "lower" than both the "low" temperatures associated with conventional PCCI and the "higher" temperatures associated with conventional SI and DI CI. One is that these RI species related reactions require far less total energy for their activation (and thus require far less supplied heat) than the fuel-$O_2$ chain-initiation reactions generally responsible for initiating combustion in PCCI. The temperatures required for both the third body dissociation of $H_2O_2$ via Equation (2) and the $OH^-$-driven decomposition of the fuel via Equation (3) are generally well below the "low" temperatures required for direct $O_2$-driven fuel decomposition, while the temperatures required for direct thermal dissociation and third body dissociation of the same fuel are often higher than those required for $O_2$-driven fuel decomposition. Further, because these RI species related reactions are relatively more dependent on the concentrations of the RI species, they are also comparatively less dependant on the ratio of the air to fuel concentrations. This makes ignition possible under much leaner conditions than are typically possible with conventional SI, PCCI and DI CT. Also, as it progresses, the lower temperature RI autoignition activity serves to generate more RI species.

The reaction rates of the dominant reactions and reaction sets driving this RI activity are functions of both the concentrations of the key reactants and of the temperature of the reacting main chamber gases. Thus, in the full HCRI engines of process 100 the overall "tempo" of this autoignition activity builds until a point at which the tempo literally "takes off". While these dominant reactions continue to dictate for a some period of time after this "take off" point (as long as the fuel supply remains), eventually other sub-mechanisms take over, leading ultimately to high temperature chemistries that result in $H_2O$ and $CO_2$.

This generalized description of full HCRI applies to dual-fuel (and multi-fuel) RI chemistry in which the re-activities of all the constituents (of the fuel) with $OH^-$ are compatible. In such cases, the general mechanism will be the same, with the dominant reactions for each constituent of the fuel being of the same form (with of course their own F, $R_i^-$ and other species) (SAE Paper No. 2007-01-0047 [Blank] and combined SAE Paper No. 2007-01-1912 and JSAE Paper No. 20077210 [Blank], which is incorporated by reference in its entirety). In operations in which the re-activities of the fuel constituents with $OH^-$ are not similar, initially at least the general reaction sub-mechanism will typically follow the activity of the fuel constituent whose reactivity with $OH^-$ is dominant.

During autoignition with homogeneous combustion, all of the fuel in the main chamber is consumed. Also, during the homogeneous combustion of the fuel, relatively large quantities of the OH radical are produced. Before the end of autoignition the concentration of the main chamber $OH^-$ peaks. Moreover, the rate of heat release is much faster than with ignition in the variants of un-augmented CI and SI. Thus, at the completion of the homogeneous combustion the specific internal energy state of the gases in the main chamber 34 is peaked. Accordingly, the pressure and temperature of the main chamber gases also peak almost immediately after the completion of autoignition. Thus an enormous pressure difference between the main chamber 34 and M-C's 32 develops. This in turn peaks the mass jet velocities and mass flow rates between these chambers 34 and 32, driving the relatively large quantities of OH⁻ and energy into the M-C's 32 under extremely high turbulence levels.

In addition to sharing the definitive general chemistry of full HCRI, the RIS-augmented engines of HCRI process 100 also share many of the other features exhibited during full HCRI ignition and combustion. For example, the combustion is also homogeneous in the RIS-augmented PCCI engine of HCRI process 100. Additionally, during the combustion event in the four main RIS-augmented engines of HCRI process 100, the pressure, temperature, OH⁻ concentrations and specific internal energy of the main chamber gases also peak. As a result, high mass flow rates also evolve in these embodiments, carrying relatively massive quantities of OH⁻, other chemical reaction products and energy into the M-C's 32 under the extremely high turbulence levels.

As an optional step within the full HCRI and the PCCI RIS-augmented engines of HCRI process 100, immediately prior to the point in the cycle at which the "tempo" of the autoignition activity is about to "take off", a general main chamber ignition-timing augmentation device 56 (FIG. 2A) can be used. The purpose of the ignition-timing augmentation device 56 in the full HCRI engines and in the PCCI RIS-augmented engine is not to initiate autoignition. Rather the purpose is to assist the accuracy of the timing of the point (position in the cycle) where the "tempo" of autoignition activity literally "takes off". At this point in either a full HCRI cycle on in a PCCI RIS-augmented cycle, because the combination of the heat of compression and the RI species activity have together already made the main chamber fuel-air mixture just ready for ignition (via the extensive OH⁻ generation), any small joint rise in pressure and temperature will cause the bulk ignition of the fuel-air gas charge in one go (which by definition is homogeneous combustion). Examples of ignition-timing augmentation devices 56 may include spark plug type devices, catalytic-ignition devices, plasma-jet-generating devices, flame-jet-generating devices, etc., where the objective of such devices is in creating a relatively small (or even large) but/and very sudden internal energy increase in some portion of the main chamber fuel-air gas charge. In the two SI RIS-augmented embodiments of HCRI process 100, this step is not optional.

A key to the generation of the new RI species in the M-C's 32 is "OH—RI species induced" (driven) chemistry caused by the well-timed influx of main chamber OH⁻ into the RI species laden gases of the M-C's 32. This influx occurs during and just after ignition. Also, this influx enables extremely high turbulence levels in the M-C's 32. Thus, there is an immediate mixing of the hydroxyl radical with the M-C gases (including fuel and RI species) at the smallest turbulent length scales. Perhaps as important to RI species generation in the M-C 32 is the relatively high quantity of enthalpy also being received in the M-C 32 from the main chamber 34, causing the M-C temperatures to start to rise rapidly.

In event 8 140, the sudden presence of this higher (and for a time, increasing) quantity of OH⁻ in the M-C's 32 acts in effect as a "driving force" to rapidly convert the resident M-C fuel into more RI species. Also, the overall chemical activity of the M-C 32 is further accelerated by the rapidly rising temperature (due to the relatively enormous amount of enthalpy transfer). The M-C's 32 are designed and controlled so that during the last part of the main-compression event and first part of the power-expansion event the states of their gases can be thermally maintained in the "Cool Flames" and/or "Slow Combustion" regions of FIG. 3 (if the fuel has a cool flames region). Sometimes also (as in SAE Paper No. 2007-01-0623 [Blank]) it is expedient to very briefly take the state of the M-C gases slightly into area "B" or the "Ignition" region of FIG. 3 before a sudden conduit 42 flow reversal (due in part to the power-expansion event in the main chamber 34) takes the state back in area "A" (FIG. 3) without igniting the M-C gases.

In general, for a hydrogen molecule or a smaller molecule alcohol or a smaller molecule hydrocarbon as F, among the most dominant reactions found in the general sub-mechanisms for this mini-chamber OH-induced chemistry is again the general reaction set:

where as before $R_i^-$ are molecules with one less H than molecule F. Though the dominant mechanisms for OH-fuel reduction in the M-C become much more complex for a larger hydrocarbon or a larger alcohol molecule as F, the same principles apply.

The sub-mechanisms for subsequently converting the various $R_i^-$ (and other sub-mechanism generated species) into RI species are more complex, with heavy dependence on effects of the significant concentrations of fuel and RI species already present in the mini-chamber. And as the new quantities of the RI species increase (due to these sub-mechanisms), part of the new $H_2O_2$ being created is then sacrificed to create additional OH⁻ via exothermic reaction Equation (2) to help accelerate the OH⁻ decomposition of the fuel into the various $R_i^-$ and other species. Similarly the other RI species resident in the M-C 32 help in both the generation of more OH⁻ and more RI species in a complex chemical-kinetics sub-mechanism. Thus the overall RI species generation mechanism is both OH-driven and RI species-driven, or "OH—RI species driven". Though the dominant autoignition chain-branching mechanisms become much more complex with a larger hydrocarbon or a larger alcohol molecule as F, the same principles apply, with the role of the hydroxyl radical (OH⁻) dominant in the fuel decomposition.

This generalized M-C RI species generation process is universal to all full HCRI and all RIS-augmented embodiments of HCRI process 100. Also, although this generalized description is based on the same fuel being inserted into the main chamber 34 and M-C's 32 (when the fluid being inserted into the M-C is in fact fuel), in dual-fuel or multi-fuel insertion operations the same is true for all the constituents (of the fuel) inserted into the engine. In such cases, if the re-activities of the all the constituents (of the fuel) with OH⁻ are compatible, the dominant reactions for each are of the same form (with of course their own F, $R_i^-$ and other species) (SAE Paper No. 2007-01-0047 [Blank] and JSAE Paper No. 20077210 [Blank]). In operations in which the re-activities of the fuel constituents with OH⁻ are not similar, initially at least the general reaction sub-mechanism will typically follow the activity of the fuel constituent whose reactivity with OH⁻ is dominant. This RI species generation process continues to strengthen until the supply of OH⁻ from the main chamber 34 is cut off by the sudden M-C to main chamber conduit 42 flow reversal mentioned earlier (and caused in part by the power-expansion event), after which, this process dies off.

Based on this abbreviated chemical-kinetics description of the M-C RI species generation process, the role of the control fluid can be delineated. Relative to the air, the higher the concentration of fuel in the M-C 32, the faster this sub-mechanism will produce additional RI species. The reverse is also true. This is demonstrated in SAE Paper No. 2007-01-0013 [Blank], which is incorporated by reference in its entirety. This fill chemical-kinetics study shows why the timing of main chamber 34 autoignition (SOC) can be directly controlled in full HCRI engines of HCRI process 100 by the regulation of the quantity of the control fluid inserted into the M-C's 32. This reference demonstrates that the quantity of the control fluid inserted into the M-C 32 precisely determines the quantity of RI-species generated in the M-C 32 (for use in the next main chamber combustion event). Thus, the RI species generation process can be directly controlled by using the engine electronic control system 30 (FIG. 2B). At the correct times (depending on a particular engine operating condition) the electronic control system 30 directs the mini-chamber RI species generation control fluid supply distribution system 96 to send proper amounts of control fluid through the control fluid supply lines 50 (FIG. 2B) to the control-fluid insertion devices 44A and/or 44C of certain M-C's 32 (FIG. 2A). These control fluid insertion devices deliver control fluid into these M-C's 32 via the control fluid insertion orifices 46.

In the PC-HCRI engine and the two premixed fuel RIS-augmented engines of HCRI process 100 the control fluid is likely be a liquid or gas that can serve to dilute the fuel concentration of the M-C as needed (relative to the air concentration). More dilution decreases the RI species generation rates and less dilution increases the RI species generation rates. Conversely, in the DI-HCRI embodiment and the two DI fuel RIS-augmented of HCRI process 100, the control fluid is best the fuel (or a constituent of the fuel). With such as the control fluid, when it is necessary to increase or decrease the RI species generation, the fuel concentrations of the M-C are strengthened or weakened accordingly.

Based on the abbreviated chemical-kinetics description of the M-C RI species generation process, the role of the general M-C RI-species generation-control augmentation device 54 can also be delineated. The general M-C RI-species generation-control augmentation device 54 can be an apparatus capable of increasing or decreasing the overall rates of the M-C RI species generation chemical-kinetics process by some means. Specifically, these M-C augmentation devices 54 either speed or slow the overall reaction rates of reaction set

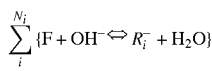

(when F is a smaller molecule) Equation (4)) or its more complex equivalents (when F is a larger molecule) along with the sub-mechanisms for subsequently converting the $R_i^-$ species (and other sub-mechanism generated species) into additional RI species and more $O^-$. In particular, the overall reaction rate of dominant exothermal reaction $H_2O_2+M \Leftrightarrow OH^- + OH^- + M$ (Equation (2)) contained within the RI species generation mechanisms is highly sensitive to temperature and to the concentration of $H_2O_2$. Also, the overall reaction rates of the reactions of Equation (4) and its more complex equivalents (for the larger molecule fuel constituents) are highly sensitive to both temperature and to the concentration of $OH^-$.

Finally, the dominant follow-on reactions for converting the products of reaction set Equation (4) into new RI species are highly sensitive to the temperature and the existing concentrations of the RI species.

Thus, various apparatus capable of affecting the temperature of gases of the M-C in a controlled manner and/or of augmenting the concentrations of $OH^-$ and/or any of the RI species within the M-C in a controlled manner, are among those considered to be M-C RI-species generation-control augmentation devices 54. For example, one full chemical-kinetics experiment has shown that the regulation of the M-C wall temperatures alone can be used to both control the quantity of RI species generated in the M-C 32 and control the timing of autoignition in the main chamber 34 (SAE Paper No. 2007-01-0047 [Blank], which is incorporated by reference in its entirety). Alternatively, devices capable of changing the volume of the M-C 32, or of inserting other chemical additives into the M-C 32 or of any other function that can help in regulating the quantity of RI species generated by the M-C 32, are also considered to be M-C RI-species generation-control augmentation devices 54. These M-C augmentation devices 54 can be used alone (or in conjunction with proper regulation of the control fluid insertion) to directly control the quantity of RI species generated by the M-C's 32. Under the direct control of the engine electronic control system 30, these augmentation devices 54 are used (either together with synchronized control fluid insertion or alone) to regulate the rate of RI species generation process in the control-active M-C's 32.

In event 9 145, at some point (typically within the "well before mid" portions of the power-expansion event) the sudden conduit 42 flow reversal (mentioned earlier) occurs. Generally this occurs as a combined result of main chamber power-expansion and rising temperatures and pressures in the M-C (due to the exothermic RI species generation process). These naturally opposing developments cause the pressure ratio to reverse (so that M-C 32 pressure is greater than that of the main chamber 34). Immediately after this point a highly turbulent mass jet evolves, carrying RI species, unused fuel, unused oxygen, enthalpy, other chemical reaction products, etc., out of the M-C's 32 and into the main chamber 34 with which they are in thermo-fluid communications. Depending on the HCRI engine embodiment and physical location of the M-C 32, while this transfer is typically to the same main chamber in which ignition and combustion occurred, in some IC engines it may also be to another main chamber 34. In such a case the flow reversal may be due instead to the pressure drop that occurs when the M-C's conduit 42 shifts communication to the other main chamber 34. In either case, after this and because of the rapid transfer of enthalpy, the pressures in the affected M-C's 32 begin to drop more rapidly. This pressure drop during the "before mid" power-expansion period results in a drop in temperature of these M-C's 32. The bulk of the radial species in the affected M-C's 32 subsequently go into states of frozen (or near frozen) equilibrium.

Though there is a rapid temperature drop in the main chamber 34 that accompanies the main chamber pressure drop during the "well before mid to late" portion of the power-expansion event, the temperatures in the main chamber 34 are still high enough for main chamber RI species activity. Also, although the $OH^-$ concentration in the main chamber is dropping with temperature, during the "mid-to-late" portion of the power-expansion process, its concentration remains significant. Thus, because of the pressure differences between the chambers (32 and 34), unconsumed M-C fuel and oxygen together with quantities of mini-chamber RI species, etc. are transferred into the main chamber 34 from those M-C's 32 that are discharging mass via high-speed highly-turbulent jets. These quantities are thus discharged directly into the heavily OH⁻ laden gases of the main chamber 34 and rapidly mixed. This situation results in a second OH-RI species induced (driven) RI species generation process of the cycle, producing new main chamber RI species. This process continues on through (and often beyond) the blow-down portion of the exhaust event. Thus the supply of RI species needed for radical ignition in the later cycle(s) falls also on the two post-autoignition processes taking place in the main chamber 34.

A first post-autoignition process is RI species retention. Typically, much of the RI species (especially the $CH_3HCO$ and $CH_2O$, depending on the fuel) exiting the M-C 32 (during the power stroke and blow down) are not consumed as they are expelled to the main chamber 34, but are retained and serve as part of the driving force for the second process. However, because of the initially high temperatures (when the state of the main chamber gases is still in area "B" of the Ignition Region of FIG. 3), typically a portion of the discharged M-C RI species (including some of the $HO_2$ and more of the $H_2O_2$) is lost (consumed) between the time of well before mid-to-mid power-expansion flow reversal and the transition of the main chamber gases from Area "B" of the "Ignition Region" back into area "A" of the "Slow Combustion Region".

A second process (of the post-autoignition processes) is main chamber RI species generation. This begins sometime during the transition of the state of the gases in the main chamber back into area "A" (see FIG. 3), resulting primarily in $H_2O_2$, but also in more $HO_2^-$ (initially) and in more of the other RI species. This generation process is fueled and driven by the relatively high quantities of fuel and RI species coming out of the M-C 32 and the adequately high OH⁻ concentrations still retained in the main chamber 34. Generally this generation process takes place in two phases, each with its own unique sub-mechanisms. The first phase sub-mechanism starts during the transition into area "A" and continues until the start of main chamber blow-down. The second phase mechanism begins after the start of main chamber blow down and continues for awhile.

In this relatively high OH⁻ environment, for a hydrogen molecule or a smaller molecule alcohol or a smaller molecule hydrocarbon as F, the dominant general reaction throughout both phases of the main chamber 34 RI species generation process is again (as in the M-C RI species generation process) the reaction set:

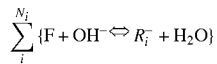

(Equation (4)). Though the dominant mechanisms for OH-fuel reduction in the main chamber 34 become much more complex for a larger hydrocarbon or a larger alcohol molecule as F, the same principles apply. The sub-mechanisms for subsequently converting the $R_i^-$ species (and other sub-mechanism generated species) into the RI species are however typically different from those of the M-C RI species generation process. Also, the sub-mechanisms for converting the $R_i^-$ species (and other sub-mechanism generated species) into the RI species are generally different for the two main chamber phases. The differences in these sub-mechanisms are due primarily to the difference in the temperature values prevailing in the main chamber 34 during the respective phases.

In addition to occurring in all full HCRI engines of HCRI process 100, when the degree of RIS-augmentation is above a meaningful threshold, this generalized main chamber RI species generation process occurs as well all RIS-augmented embodiments of HCRI process 100. And although this generalized description is based on the same fuel constituent being inserted into the main chamber 34 and M-C's 32 (if a fuel constituent is in fact the control fluid for the control-active M-C's), in dual-fuel or multi-fuel insertion operations the same can be true for each fuel constituent inserted. In multiple fuel constituent cases, some of the M-C fuel constituents being discharged (during power-expansion and blow down) are in any case earlier main chamber fuel constituents that were trapped in the M-C's 32 during the main-compression event. Moreover, if the reactivities of the all the fuel constituents with OFF are compatible, the dominant reactions for each constituent are of the same form (with of course their own F, $R_i^-$ and other species). However, in operations in which the reactivities of the fuel constituents with OH⁻ are not similar, initially at least the general reaction sub-mechanism will typically follow the fuel constituent whose reactivity with OH⁻ is dominant.

During some point in the exhaust process, the main chamber RI species still remaining in the main chamber 34 will also typically go into states of frozen (or near frozen) equilibrium. Subsequently, the cycle is repeated, starting with event 1 105.

Of its inherent general design features, HCRI engine 200's ability to operationally enable HCRI process 100 and other embodiments is predicated on the exemplary engine electronic control system 30 depicted schematically in FIG. 2B. The engine electronic control system 30 helps to enable the HCRI engine embodiments of HCRI engine 200 to both use and enable the various embodiments of HCRI process 100, including the fill HCRI embodiments and the RIS-augmented embodiments.

It is hereinafter understood that the general engine control system 30 is capable of those functions necessary for the operation of HCRI engine 200 that are represented in the engine control system prior art. In addition to those functions represented in the prior art, the general engine control system 30 is capable of regulating the placement of the small amounts of RI-species generation control fluid in the concerned control-active M-C's 32 for a purpose of controlling both the M-C RI species generation process (directly) and the main chamber RI species generation process (indirectly) to in turn enable the controlled RI species enhancement of combustion in the main chamber's 34. For precisely the same purpose (of controlling), the general engine control system 30 is also capable of regulating the general M-C RI-species generation-control augmentation devices 54. Finally, the general engine control system 30 is capable of controlling the other RI-species generation-control augmentation devices 64 and 70 and/or the ignition-timing augmentation devices 56 that may be employed for the same purpose (of controlling). Though this general control system 30 may make use of sensor directed logic and/or a combustion-history aided management sub-system, the use of RI species to help control the combustion will typically lessen its required overall sophistication (in comparison to some of the latest of the conventional control systems of the field and related fields).

HCRI engine 200 includes a number of additional general design features that are inherent to its ability to operationally use and enable HCRI process 100. Especially important are those features that help determine the chemical compositions and production capacity of the M-C's 32. For example, the chemical composition of the mixtures in these secondary chambers is in part determined by the parameters affecting the hydrodynamic filling and emptying rates of the M-C's 32. The volume of the M-C 32 and the height (or effective diameter), length, placement and configuration of the conduits 42 are dominant parameters in setting these rates.

Concerning M-C volume, when the movable power-producing component 40 within a engine combustion cylinder of HCRI engine 200 is at the top dead center ("TDC") position for a given main combustion chamber 34, the ratio of the combined volumes of all of the M-C's 32 in communication with the given main chamber 34 to the minimum volume that the given main chamber 34 can have, will be a value generally between (but is not limited to) 0.01 and 0.25 to 1.0. Thus, in general—

$$0.01:1 \leq \sum_{i=1}^{N} V_{M-C}^{i} : V_{M.C.}^{min} \leq 0.25:1, \tag{5}$$

where, $V_{M-C}^{i}$ is the volume of the $i^{th}$ mini-chamber in the cylinder that are in communication with the said main combustion chamber, N is the total number of mini-chambers in the cylinder in communication with the said main combustion chamber, $V_{M.C.}^{min}$ is the minimum volume the given main combustion chamber 34 can have during its combustion cycle, and the symbol ":" indicates ratio. The minimum volume the given main chamber 34 can have is its volume when the movable work-power producing component 40 is in the TDC position. The breadth in this range of volume ratios (0.01:1 to 0.25:1) is due in part to the diversity in the fuel and in part to the accompanying wide range of compression ratios (CR's) required for the autoignition of fuel via RI species. The volumes of each of the M-C's 32 in a single engine combustion cylinder need not be the same. Further, for the purpose of control, the volumes of some or all of the M-C's 32 may be reduced (or expanded) via employments of one of the general M-C RI-species generation-control augmentation devices 54 during the operation of HCRI engine 200, thus reducing (or increasing) the ratio (and changing the M-C geometry).

The conduits 42 themselves can be vents, orifices, channels, slots, adequately-porous meshes, membranes, etc. Depending on the fuel, the selection of the dimensions, configuration and location of these conduits 42 can have different considerations. The conduits are typically designed such that combustion flames from the main chamber 34 are quenched before such flames can be extended into the M-C's 32. And for all operating conditions of the engine, these mini-to-main chamber-connecting conduits 42 are best designed so that at the higher pressures, the inflows and outflows of compressible gases through them (to and from the M-C's 32) are throttled (though not necessarily). It is typically preferred that the pressure conditions in the M-C's 32 lag behind main chamber 34 pressure conditions (as shown by SAE Paper No. 2007-01-0047 [Blank]). It is also typically best that the flows in the conduits 42 not to be choked, though in certain physical configurations they can be choked in for periods of time. An example of a full DI HCRI engines in which there is a required period of choked conduit flow is described in SAE Paper No. 2007-01-1254 (Blank), which is incorporated by reference in its entirety.

Additionally, the placement of the conduits 42 and the number of conduits 42 per M-C 32 are important factors (SAE Paper No. 2007-01-0013 [Blank]). The inclination of these conduits in relation to the M-C's 32 has an effect on the turbulence mixing rates of the constituents within the M-C's 32. Similarly, the positioning of the conduits 42 is also often predicated on the "aiming" of the occasionally exiting outflow mass jets. This is because a second major function of the M-C's 32 is to generate large quantities of additional turbulence for main chamber mixing. In this regard the mass jets are often best aimed by the conduits 42 into optimum locations in the main chamber 34 to help maximize the effects of the turbulence generated by this mass jets.

As referenced above in the description of HCRI process 100 in event 1 105 of FIG. 1, the role of recycled gases in RI species augmentation can be very important. If there is recycling back to the main combustion chamber 34 of some percent of the exhaust gases (either internally of externally) via the general exhaust-gas recycling device (system) 62, generally the same or some proportional percent of exhausted RI species can be recovered (depending on the treatment of these gases as they are recycled). This follows from the relatively lower temperatures of the exhaust gases and the fact that some of the RI species within them may have also gone into frozen equilibrium or near frozen equilibrium.

Also in relation to the exhaust gases 68, the exhaust-gas RI-species generation-control augmentation device 64 can be located either alongside or within the exhaust-gas recycling device 62 to help control/augment the RI species made available for future cycles. The most typical functions of the exhaust-gas RI-species generation-control augmentation device 64 include stabilizing and/or increasing/reducing the RI species concentrations in the recycled exhaust gases (68 or 68'). When no control-active M-C's 32 are being employed, the RI-species generation-control augmentation devices 64 can be used to play a more major role. Thus, use can be made of the general exhaust-gas recycling device (system) 62, together with its augmentation device 64, and under the direct regulation of the engine electronic control system 30, to help control the quantity of RI species made available to the combustion event of a main chamber 34 of a future cycle.

An example of the stabilizing function of augmentation device 64 is given in joint SAE Paper No. 2007-01-1887 and JSAE Paper No. 20077212 (Blank), which is incorporated by reference in its entirety. The HCRI engine of these references passes the exhaust gases through a heat exchanger device (serving as an example of the exhaust-gas RI-species generation-control augmentation device 64). This cools the returning exhaust to the temperature of the intake gases 66 to insure that there is no reaction activity during the mixing of the returned exhaust gases 68' and the intake gases 66. Also, this reference demonstrates that the regulation (via device 62) of the RI species return component of these recycled exhaust gases can be used alone to control the timing of autoignition in the main chamber 34 of 4-stroke reciprocating DI-HCRI embodiment of HCRI engine 200.

These features of the exhaust-gas recycling device 62 are further illustrated by the full chemical-kinetics simulation demonstration given in SAE Paper No. 2007-01-0135 (Blank), which is incorporated by reference in its entirety. In this reference the internal retention of the exhaust gases 68 (from cycle to cycle) is controlled by regulation of boost pressures of the intake gases 66 in coordination with exhaust pressures being maintained. In this reference it is shown why the control of the internal retention of the exhaust gases (and thus the RI species retained in the main chamber 34) by the regulation of the intake gas boost pressures can alone be used to control the timing of autoignition in 2-stroke reciprocating DI-HCRI embodiments of HCRI engine 200. Similar results can be obtained instead by operational management of other aspects of the intake-gas entry devices 58 and exhaust-gas exit devices 60. For example, geometries and other factors affecting flow patterns and flow rates in these devices (58 and 60) can be operationally managed.

Also, the RI species and the waste heat in the exhaust gases may be used in augmentation device 64 to generate additional RI species and/or other species for inclusion in the intake gases 66. Because relatively high concentrations of RI species are already present in the recycled exhaust gases of the HCRI engine, one example means for augmenting the RI species concentration is to simply insert additional fuel into the exhaust gases. Depending on the temperatures in play, this will cause a general reaction sub-mechanism sequence akin to that found in the general main chamber pre-autoignition processes (starting with $HO_2^-$ and/or $OH^-$ driven fuel decomposition) in event 6 130 of FIG. 1. Alternatively, another means is to inject oxygen-laden air into the recycled exhaust gases to oxidize (and thus consume) some portion of the exhaust gas RI species content. The functions of this augmentation device 64 can also include adding other chemical species (including fuel additives) into the recycled exhaust gases (68 or 68'). To these ends, RI species sensor devices (that are apart of the engine electronic control system 30) can be incorporated into these augmentation devices 64 to help in the regulation of their functions.

Further, there is a rationale for the plurality of general intake-gases RI-species generation-control augmentation devices 70 is shown in FIG. 2A-2B. This augmentation device 70 may be placed before and/or after the return of the recycled exhaust gases 68 or 68' to the intake gases 66. Such devices 70 can make use of the RI species returning with the recycled exhaust gases (68 or 68') to augment an external process (external to the engine combustion cylinder) that produces additional RI species and/or other species for addition to the new intake gases 66. Often such devices 70 make use of to the intake gases 66 to help effect these augmentations. In addition to devices similar to or identical to those capable of carrying out the function of the exhaust-gas RI-species generation-control augmentation device 64, examples of general intake-gases RI-species generation-control augmentation devices 70 are micro-wave devices, fuel reformatting devices, LAG type devices, etc. Alternatively the general intake-gases RI-species generation-control augmentation device 70 can be used to reduce the quantity of RI species going into the main chamber 34. To these ends, RI species sensor devices may be included in these augmentation devices 70, to help in the regulation of their functions. In the premixed fuel case these augmentation devices may be placed before and/or after the fuel insertion device 44D within the intake gas entry device 58. Such intake-gases RI-species generation-control augmentation devices 70, if employed, are regulated by a part of the engine electronic control system 30.

There are other general design features inherent to HCRI engine 200's ability to operationally enable HCRI process 100 and other embodiments. One is that in most instances within DI HCRI IC engines of HCRI engine 200, fuel is often best inserted into the main chamber 34 (via insertion devices 44A and 44B) in directions that are away from the housing periphery mounted M-C conduits 42. This is optimally done in such a way that the injected spray is "directed" away from currents leading to any of the M-C's. The principle is to avoid direct entrainment of the DI fuel streams within the pressure driven jets carrying the intake gases 66 into these M-C's 32 (and to even avoid entrainment into the internal flow currents that might lead to these jets). If one or more M-C's 32 are located within the movable work-power producing device 40 the same is also true (to the extent possible). This enables such M-C's 32 to function as control-passive M-C's 32. In general, control-passive M-C's 32 contain no internal or external means for the regulation of RI species generation. Use is sometimes made of control passive M-C's 32 to take some of the load off of the control-active M-C's 32 and to make the overall control of the RI species generation process more accurate (while also reducing design tolerances). When such is desirable, control-passive M-C's 32 may also be mounted within the side housing periphery 38 or top housing periphery 36.

Finally, it must be emphasized that functionally the M-C's 32 are not for use in assisting ignition and combustion in the main chamber air-fuel gas-charge of the "current" main chamber 34 of the "current" operating cycle of an engine combustion cylinder. Rather the M-C's 32 serve as the originating generation sites in one cycle for the production of RI species for specific use in main chamber ignition and combustion in "later" combustion cycles. Therefore the M-C's 32 are not "pre-combustion" chambers.

FIG. 4A-4D collectively illustrate an exemplary rotary HCRI IC engine (hereinafter HCRI engine 300) that is an implementation of HCRI engine 200 and that embodies the HCRI process 100. HCRI engine 300 is thus also capable of using and enabling the two full HCRI and the four US-augmented embodiments of HCRI process 100. FIG. 2A-2B for HCRI engine 200 and FIG. 4A-4D for HCRI engine 300 share common features. Accordingly, in the interest of clarity, the description of some of the common features of HCRI engine 300 and its schematic depiction in FIG. 4A-4D are omitted and the description of these features with respect to HCRI engine 200 and its schematic depiction in FIG. 2A-2B are being relied upon to provide adequate descriptions of the common features. While the nomenclatures for HCRI engine 200 and HCRI engine 300 are generally the same, there are several differences for the HCRI engine 300.

For example, the movable work-power producing component 40 is also called a rotor 86. In HCRI engine 300, the main chamber 34 is the primary chamber consisting of the space (volume) formed by the rotor 86 and by portions of the "top" housing periphery 36, the "side" housing periphery 38 and by either an "end" housing periphery 94 and a "separating" housing periphery 90 or by two of the separating housing peripheries 90.

Figure 4A:
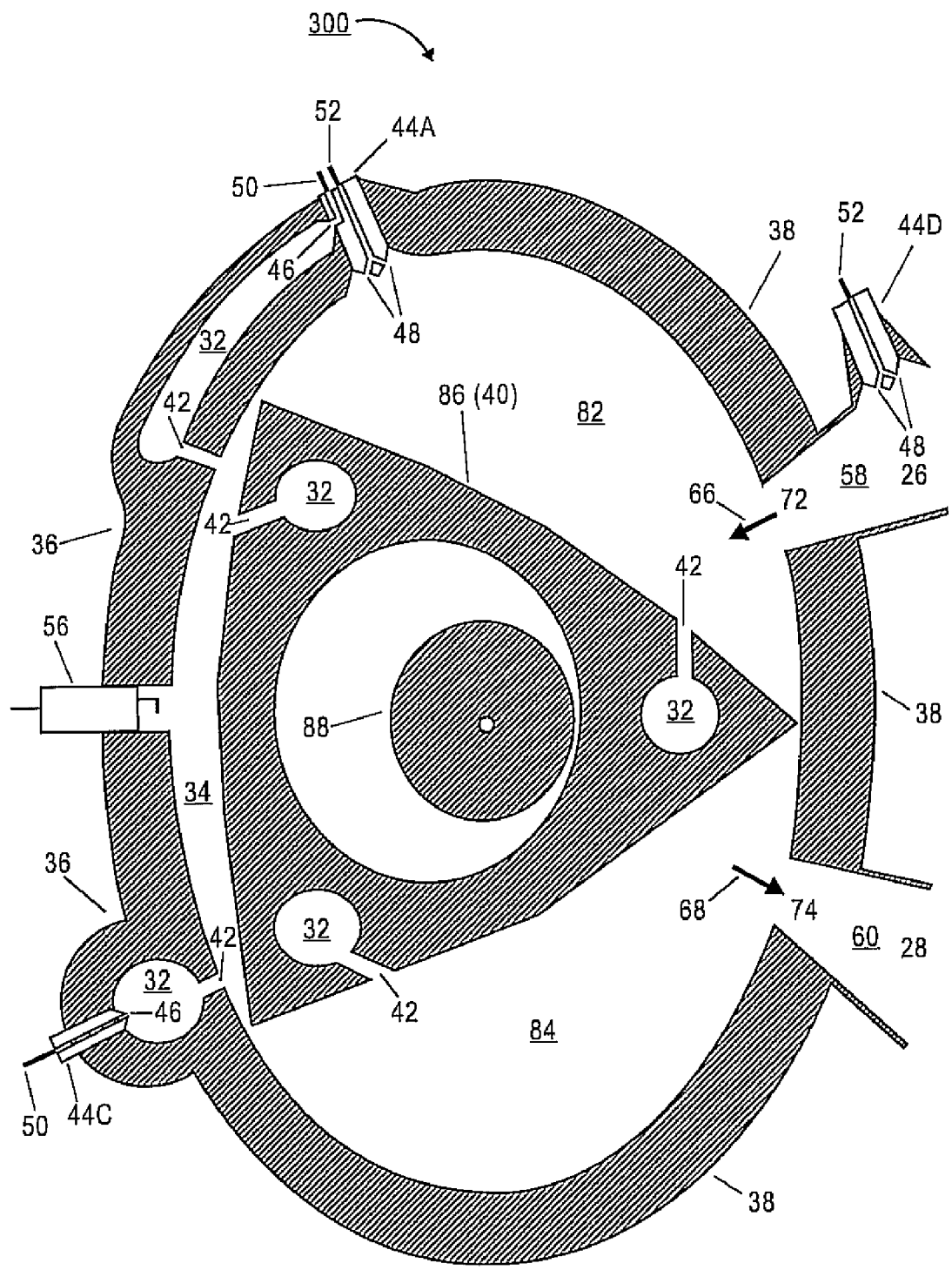
FIG. 4A depicts a schematic diagram of the interior of a single engine combustion cylinder of an exemplary 4-cylinder HRCI Rotary Combustion Engine (HCRI engine 300) utilizing the HCRI process 100 shown in FIG. 1 in accordance with HCRI engine 200.
Figure 4B:
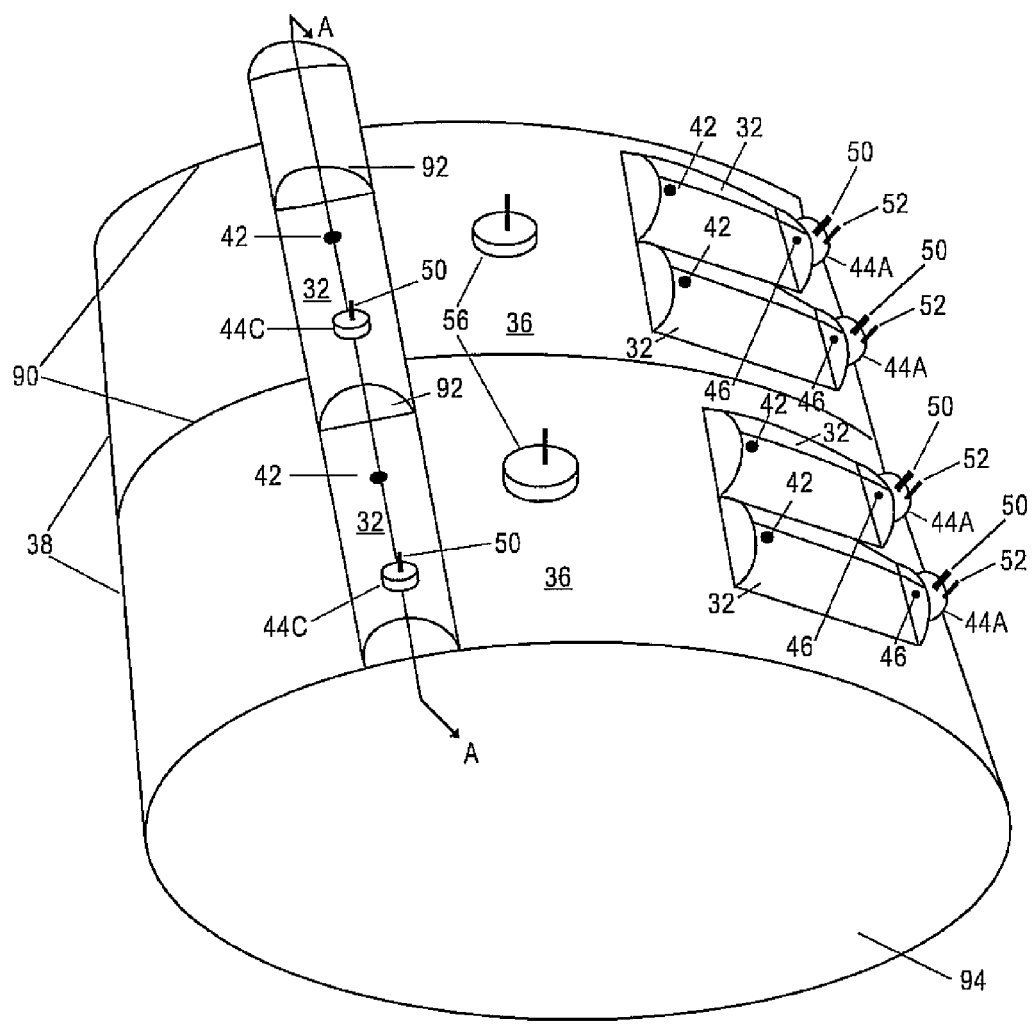
FIG. 4B depicts a top view of two engine combustion cylinders of the 4-cylinder HRCI Rotary Combustion Engine shown in FIG. 4A utilizing the HCRI process.
Figure 4C:
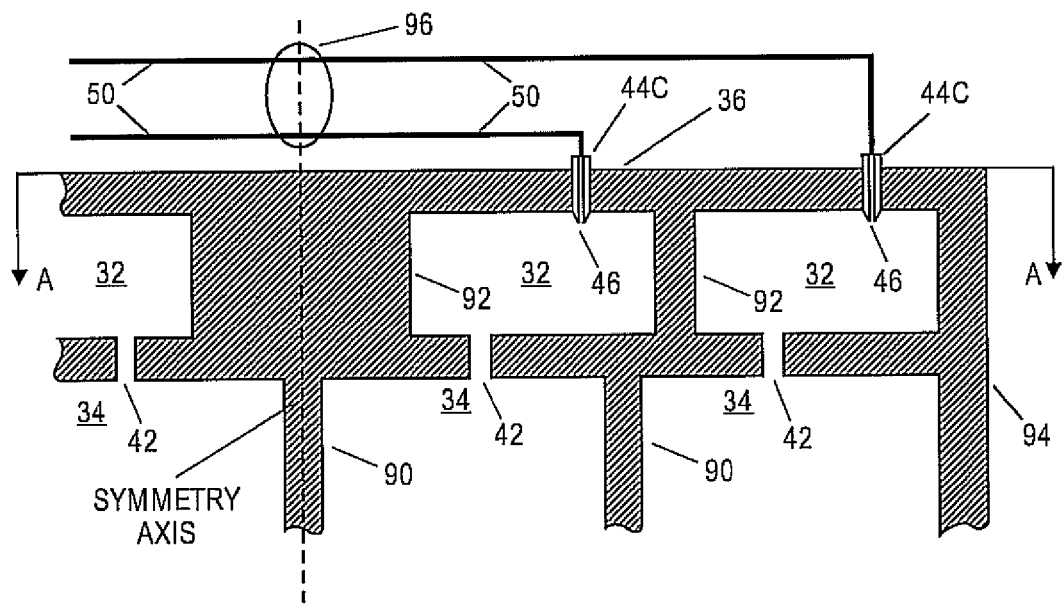
FIG. 4C depicts a top view of a housing periphery mounted mini-chamber assembly through section (A-A) for the 4-cylinder HRCI Rotary Combustion Engine embodiment shown in FIG. 4A utilizing the HCRI process.
Figure 4D:
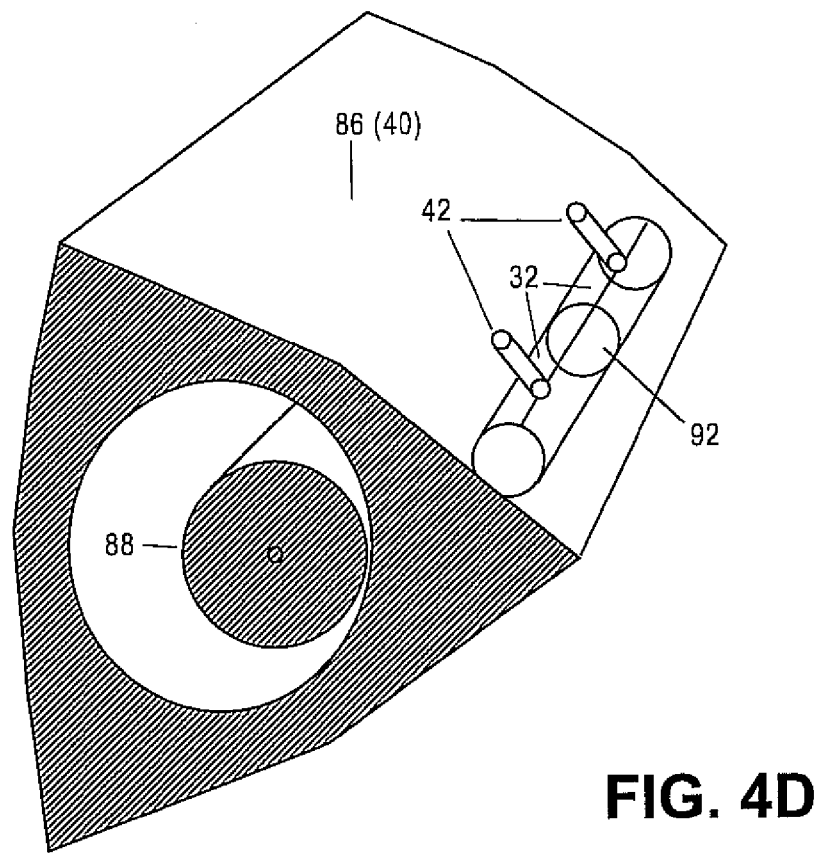
FIG. 4D depicts a side view a rotor in one engine combustion cylinder for the 4-cylinder HRCI Rotary Combustion Engine embodiment shown in FIG. 4A utilizing the HCRI process.

From FIG. 4A it can be seen that in HCRI engine 300, the rotor 86 creates three primary chambers. Depending on the position of the rotor 86, these primary chambers can have three different functions. These can either be serving in the capacity of an intake chamber 82, an exhaust chamber 84 or the main combustion chamber 34. When any of these primary chambers is involved in main-combustion pre-ignition, main-combustion ignition or main-combustion post-ignition chemical-kinetics activities, they are considered to be in a "combustion position". Further, when any of HCRI engine 300's primary chambers are in the combustion position they are considered to be one of the main chambers 34. Thus, in rotary engines the term "main chamber" 34 is understood to include the functionally equivalent portion of one or two (depending on the rotor position) of the three (or more, as in the case of the Quasiturbine engine) single primary chambers when any of the primary chambers in question are in "combustion positions".

In HCRI engine 300, the "top housing periphery" 36 is considered to be the "radially outward" (outward in relation to a shaft 88) portion of the engine housing periphery adjacent to the volume formed by the rotor and the housing periphery when one of the three budging sides of the rotor is in the "TDC" (top dead center) position (as is the left "rotor side" shown in FIG. 4A). By definition, the rotor side is in its TDC position in HCRI engine 300 when the volume between it and the inner surface of the housing periphery is at its minimum and the primary chamber it helps to form is in one of the "combustion positions" (as opposed to being in the combined exhaust-intake position in the opposite "quadrant" of the engine combustion cylinder). Thus, in FIG. 4A and FIG. 4B the "side housing periphery" 38 is considered to be the remainder of the "radially outward" housing periphery surrounding the engine combustion cylinder that is not considered part of the top housing periphery 36.

The angular motion of the rotor 86 is considered to be in the counter-clockwise direction. Thus the M-C 32 depicted in the upper left of this figure is hereinafter considered to be a "leading" M-C 32. The periphery mounted M-C 32 located at the lower left in FIG. 4A is instead consider a "lagging" M-C 32. It should be noted that FIG. 4B and FIG. 4C both depict schematic information for more than one engine combustion cylinder. The lagging M-C 32 in FIG. 4A is depicted within the engine combustion cylinder in the A-A plane shown in FIG. 4B, with details of the M-C assembly for the A-A plane (for more than two engine combustion cylinders) shown in FIG. 4C.

The intake gases 66 enter an engine cylinder via an intake port 72 from an engine intake manifold 26 (these components being parts of the intake-gas entry device 58) and the exhaust gases 68 exit an engine cylinder via an exhaust port 74 into an engine exhaust manifold 28 (these components being parts of the exhaust-gas exit device 60).

Each engine cylinder of HCRI engine 300 makes use of a pair of leading control-active M-C's 32. Each of the leading M-C's in these pairs is control fluid fed by multi or dual-fluid insertion devices 44A. Also, the single lagging control-active M-C 32 of each engine combustion cylinder is control-fluid fed by the single RI-species generation control-fluid insertion device 44C (FIG. 4A). Finally, pairs of rotor mounted control-passive M-C's 32 are embedded in each of the three sides of the rotor 86 (as shown via the combination of FIG. 4A and FIG. 4D).

Though not shown, each of the control-active M-C's are considered to have one or more mini-chamber RI-species generation-control augmentation devices 54. Also, HCRI engine 300 is considered to have (and to be operationally able to employ) exhaust-gas recycling devices 62 (with their exhaust-gas RI-species generation-control augmentation devices 64) and intake-gases RI-species generation-control augmentation devices 70.

The inclusion of both the general intake-gas entry device fuel insertion device 44D into the intake-gas entry device 58 (directly into the engine intake manifold 26 in this case) and the dual-fluid insertion device 44A into the main chamber, for pre-mixed and DI fuel insertion, respectively, and the inclusion of one ignition-timing augmentation device 56, together enable HCRI engine 300 to use and enable the two full HCRI and the four RIS-augmentation embodiments of HCRI process 100. Operations within these various process embodiments are directed by the electronic engine control system's 30 regulating of the various fuel and control fluid inserters (44A, 44C and 44D) and the various RI-species generation-control augmentation devices (54, 64 and 70), the exhaust-gas recycling devices 62 and the ignition-timing augmentation devices 56 in manners appropriate the engine operating conditions.

It should be readily apparent to those of ordinary skill in the art that exemplary HCRI engine 300 (as depicted in FIG. 4A-4D) represents a generalized rotary engine schematic illustration, and that in addition to those mentioned, other components can be added or existing components can be removed or modified. In addition, many other rotary HCRI engine variations are possible that are also capable of both using and enabling the HCRI process 100.

Figure 5A:
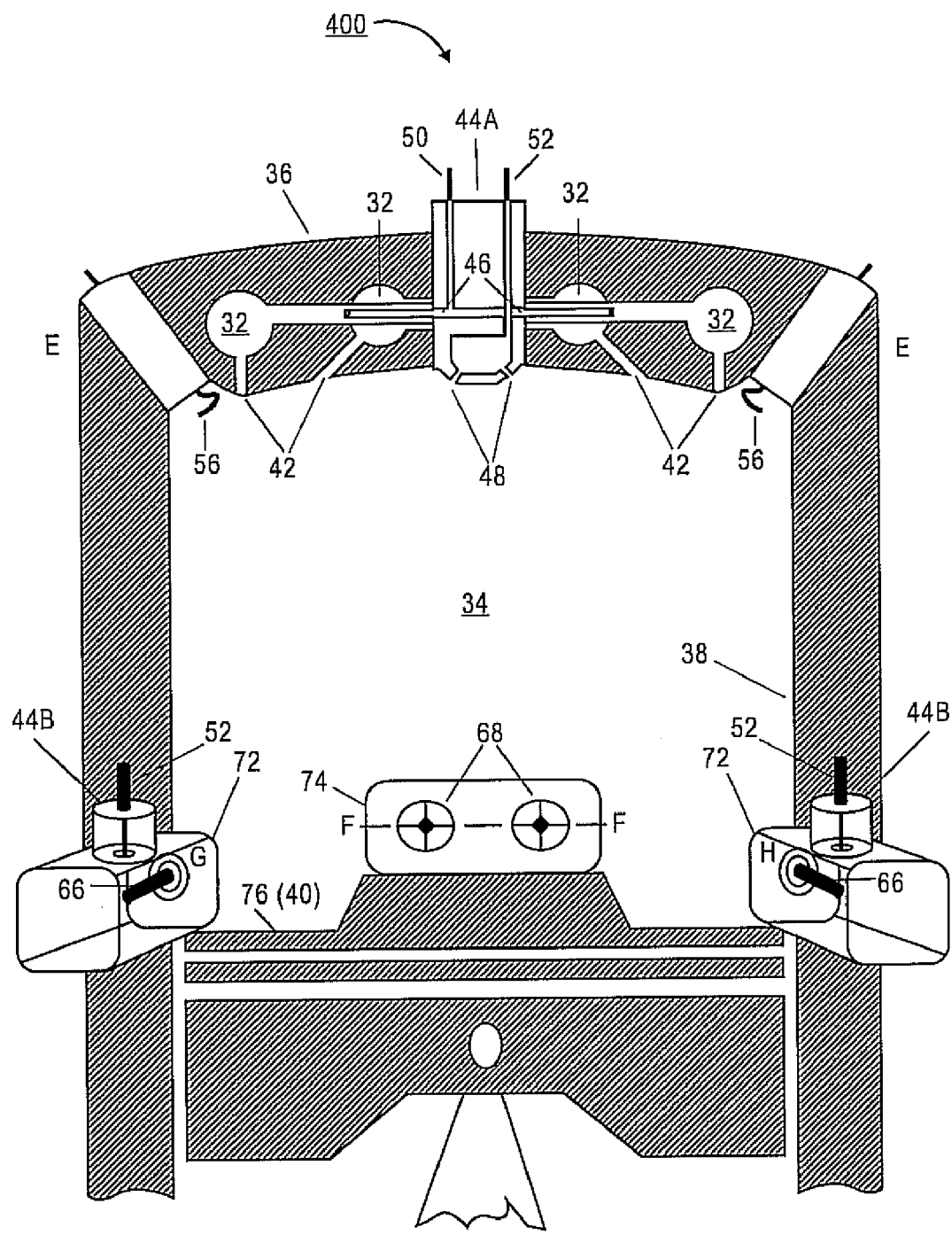
FIG. 5A depicts a schematic of internal axial cross section diagram (section through line E-E) of one engine combustion cylinder of an exemplary HRCI Two-Stroke Reciprocating Engine (HCRI engine 400) utilizing the HCRI process 100 shown in FIG. 1 in accordance with HCRI engine 200.
Figure 5B:
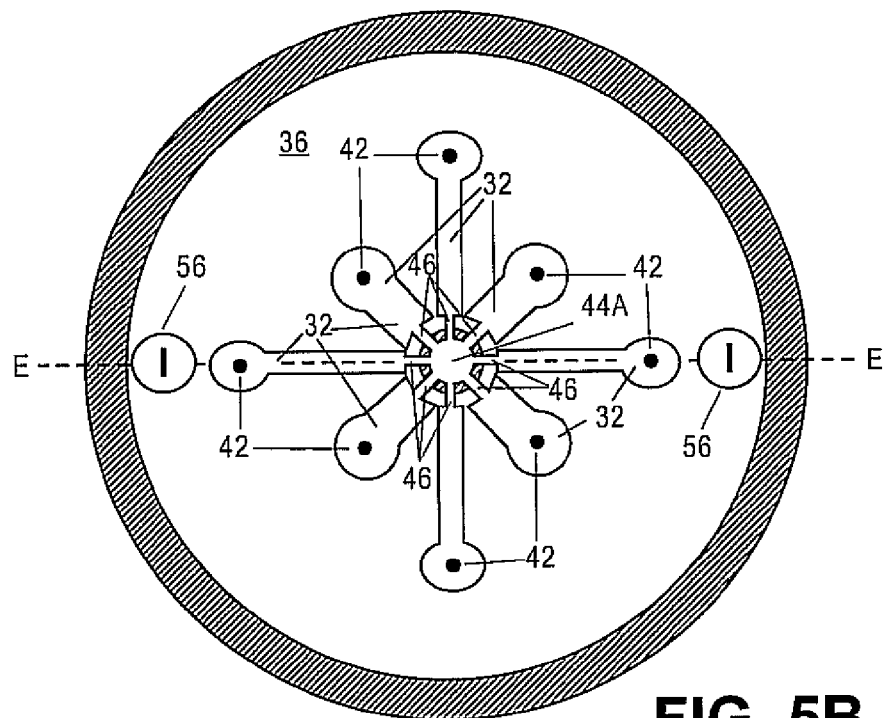
FIG. 5B depicts a schematic diagram of internal top (radial cross section through head including the line E-E) of one engine combustion cylinder of the HRCI Two-Stroke Reciprocating Engine embodiment shown in FIG. 5A utilizing the HCRI process.
Figure 5C:
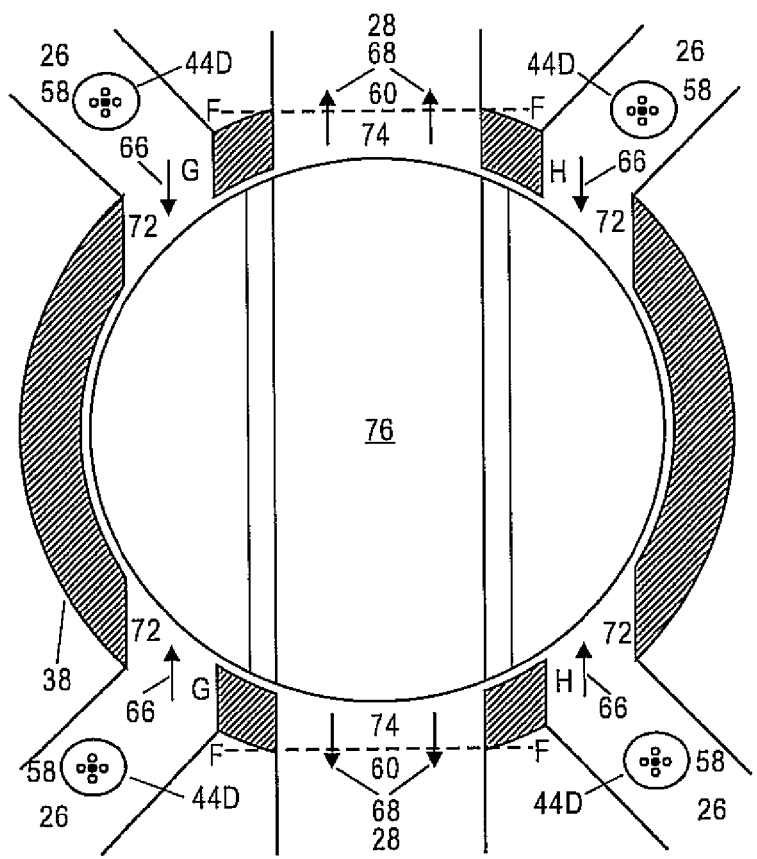
FIG. 5C depicts a schematic diagram of internal bottom (top view of radial cross section of bottom of the cylinder through lines G-G and H-H, and also showing the piston below these lines) of one engine combustion cylinder of the HRCI Two-Stroke Reciprocating Engine embodiment shown in FIG. 5A utilizing the HCRI process.

FIG. 5A-5C collectively illustrate an exemplary 2-stroke reciprocating piston HCRI IC engine (hereinafter HCRI engine 400) that is an implementation of HCRI engine 200 and that can both use and enable the HCRI process 100. HCRI engine 400 is thus also capable of the two full HCRI and the four RIS-augmented embodiments of HCRI process 100. FIG. 2A-2B for HCRI engine 200 and FIG. 5A-5C for HCRI engine 400 share common features. Accordingly, in the interest of clarity, the description of some of the common features of HCRI engine 400 and its schematic depiction in FIG. 5A-5C are omitted and the description of these features with respect to HCRI engine 200 and its schematic depiction in FIG. 2A-2B are being relied upon to provide adequate descriptions of the common features. Wile the nomenclatures for HCRI engine 200 and HCRI engine 400 are generally the same, there are several differences for HCRI engine 400.

For example, in HCRI engine 400 the movable work-power producing component 40 is also called a piston 76. The piston 76 is in the "TDC" position in HCRI engine 400 when the volume of the main chamber 34 is at its minimum. Though this specific nomenclature is not used in the depiction in FIG. 5A, the top housing periphery 36 in this 2-stroke reciprocating piston engine embodiment can also be called the "cylinder head" and the side housing periphery 38 can also be called the "cylinder liner". The top housing periphery 36 in exemplary HCRI engine 400 is a disk shaped segment of the housing periphery. This disk shaped section spans the upper portion of the engine combustion cylinder. It caps the cylinder from an axial position corresponding approximately to the bottom of the ignition-timing augmentation devices 56. The side housing periphery 38 is that part of the housing periphery of the engine combustion cylinder that starts just immediately below this axial position.

A top down view of the top periphery 36 is shown in FIG. 5B. This view passes through the axial line connecting positions E-E shown in FIG. 5A. As seen via FIG. 5B, the same dual-fluid injector 44A feeds control fluid to eight control-active M-C's 32. While four of these M-C's are of a different geometry than the other four, they all are assumed to be (though they need not be) of the same volume in the simulation experiment conducted with this embodiment in SAE Paper No. 2007-01-0135 (Blank). This figure is a functional schematic, not a detailed or scaled depiction.

FIG. 5C is a radial cross-section schematic of this engine's simple intake port 72, exhaust port 74 and piston 76 top arrangements when the piston is near its BCD ("bottom dead center") position. This is again a functional "top down view" representation, not a precise radial cross-section. Similar to the HCRI engine 300, in HCRI engine 400 the intake gases 66 enter via the intake ports 72 from parts of the engine intake manifold 26 (these components being parts of the intake-gas entry device 58) and the exhaust gases 68 exit via the exhaust ports 74 into parts of the engine exhaust manifold 28 (these components being parts of the exhaust-gas exit device 60). Similar also to HCRI engine 300 is the insertion of fuel directly into the engine intake manifold 26 via the intake-gas entry device fuel insertion device 44D. The advantage of the intake port 72 and exhaust port 74 arrangement HCRI engine 400 with the two-tiered piston surface (FIG. 5A and FIG. 5C) is the generation of highly symmetric internal flow patterns that help avoid excessive mixing of the exiting exhaust gases 68 with the incoming intake gases 66 during the intake-exhaust event (as described in some detail in SAE Paper No. 2007-01-0135 [Blank]), As in HCRI engine 200, the HCRI engine 400 can be configured with various RI-species generation-control augmentation devices (54, 64 and 70) and the inclusion of exhaust-gas recycling devices 62 are assumed. One example of the exhaust-gas recycling device 62 applicable to this embodiment is given in SAE Paper No. 2007-01-0135 (Blank). The electronic engine control system's 30 regulation of these and the various fuel and control fluid inserters (44A, 44C and 44D) and the ignition-timing augmentation devices 56 is also assumed. Regulation via control system 30 is in manners appropriate the range of operating conditions for HCRI engine 400. Thus HCRI engine 400 can both use and enable the two full HCRI and the four RIS-augmentation embodiments of HCRI process 100.

It should be readily apparent to those of ordinary skill in the art that exemplary HCRI engine 400 as depicted in FIG. 5A-5C represents a generalized 2-stroke reciprocating piston engine schematic illustration, and that in addition to those mentioned, other components can be added or existing components can be removed or modified. In addition, many other 2-stroke reciprocating piston engine HCRI engine embodiments of HCRI engine 400 are possible that are also capable of both using and enabling the HCRI process 100.

FIG. 6A-6D collectively illustrate an exemplary 4-stroke reciprocating piston HCRI IC engine (hereinafter HCRI engine 500) that is an embodiment of HCRI engine 200 and that uses the HCRI process 100. HCRI engine 500 is thus also capable of the two full HCRI and four RIS-augmented embodiments of HCRI process 100. FIG. 2A-2B for HCRI engine 200 and FIG. 6A-6D for HCRI engine 500 share common features. Accordingly, in the interest of clarity, the description of some of the common features of HCRI engine 500 and its schematic depiction in FIG. 6A-6D are omitted and the description of these features with respect to HCRI engine 200 and its schematic depiction in FIG. 2A-2B are being relied upon to provide adequate descriptions of the common features omitted. While the nomenclatures for HCRI engine 200 and HCRI engine 500 are generally the same, there are several refinements for HCRI engine 500.

For example, like in HCRI engine 400, in HCRI engine 500 the movable work-power producing component 40 is also called the piston 76, with the piston 76 at the "TDC" position when the volume of the main chamber 34 is at its minimum. Also similar to HCRI engine 400, the top housing periphery 36 in this 4-stroke reciprocating piston engine embodiment can also be called the "cylinder head" and the side housing periphery 38 can also be called the "cylinder liner". The top housing periphery 36 in exemplary HCRI engine 500 is the disk shaped segment of the housing periphery spanning the upper portion of the engine combustion cylinder. It caps the cylinder from axial positions corresponding to the two 90 degree axial-plane corners shown in the main chamber 34 in each of FIG. 6A and FIG. 6B Oust slightly above the highest possible point of travel of the example "bowl-in-piston" shaped piston 76). The side housing periphery 38 is that part of the housing periphery of the engine combustion cylinder that starts just immediately below these axial positions.

Figure 6A:
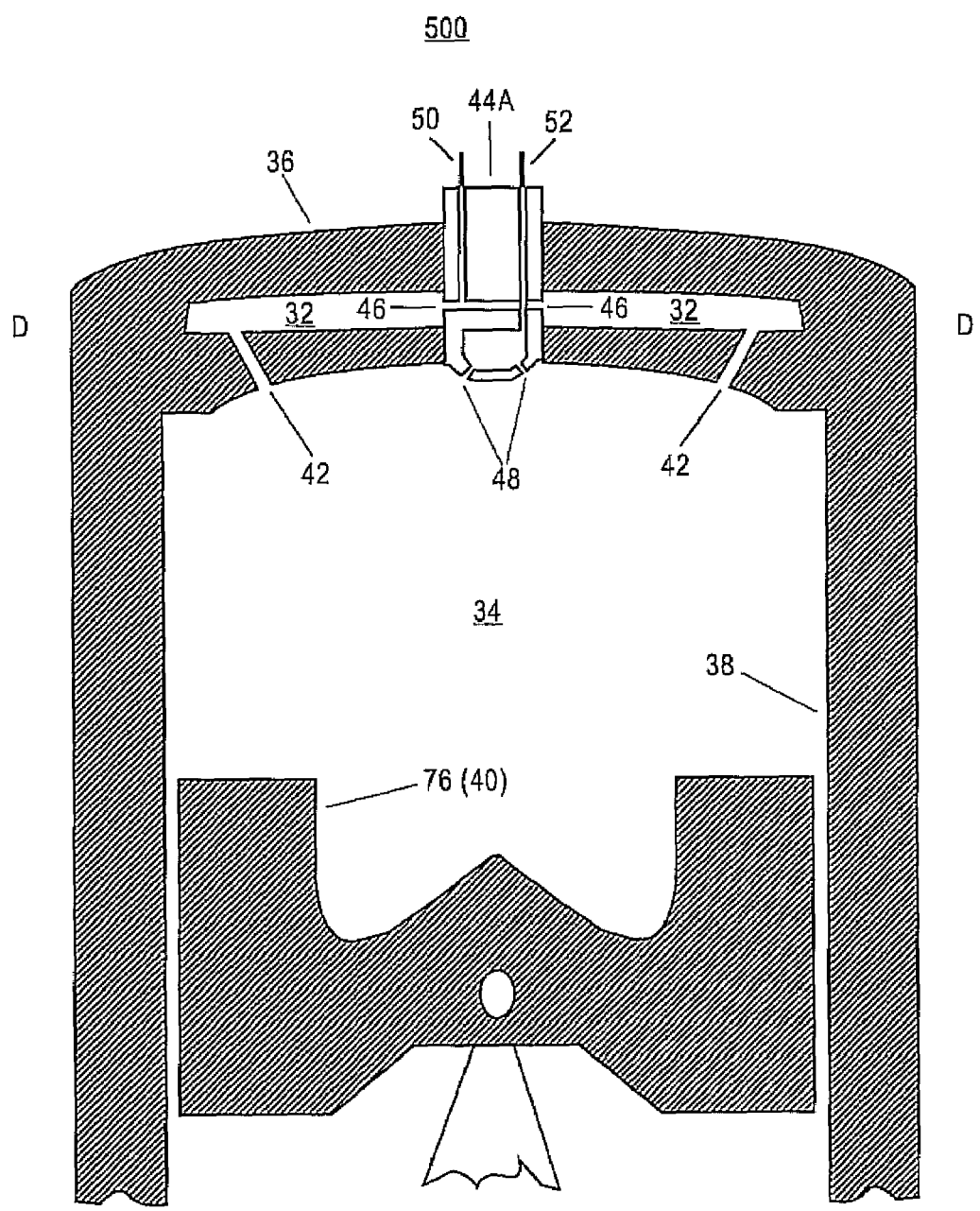
FIG. 6A depicts a schematic of an internal axial cross section diagram (section through line D-D) of one engine combustion cylinder of an exemplary HRCI Four-Stroke Reciprocating Engine (HCRI engine 500) utilizing the HCRI process 100 shown in FIG. 1 in accordance with HCRI engine 200.
Figure 6B:
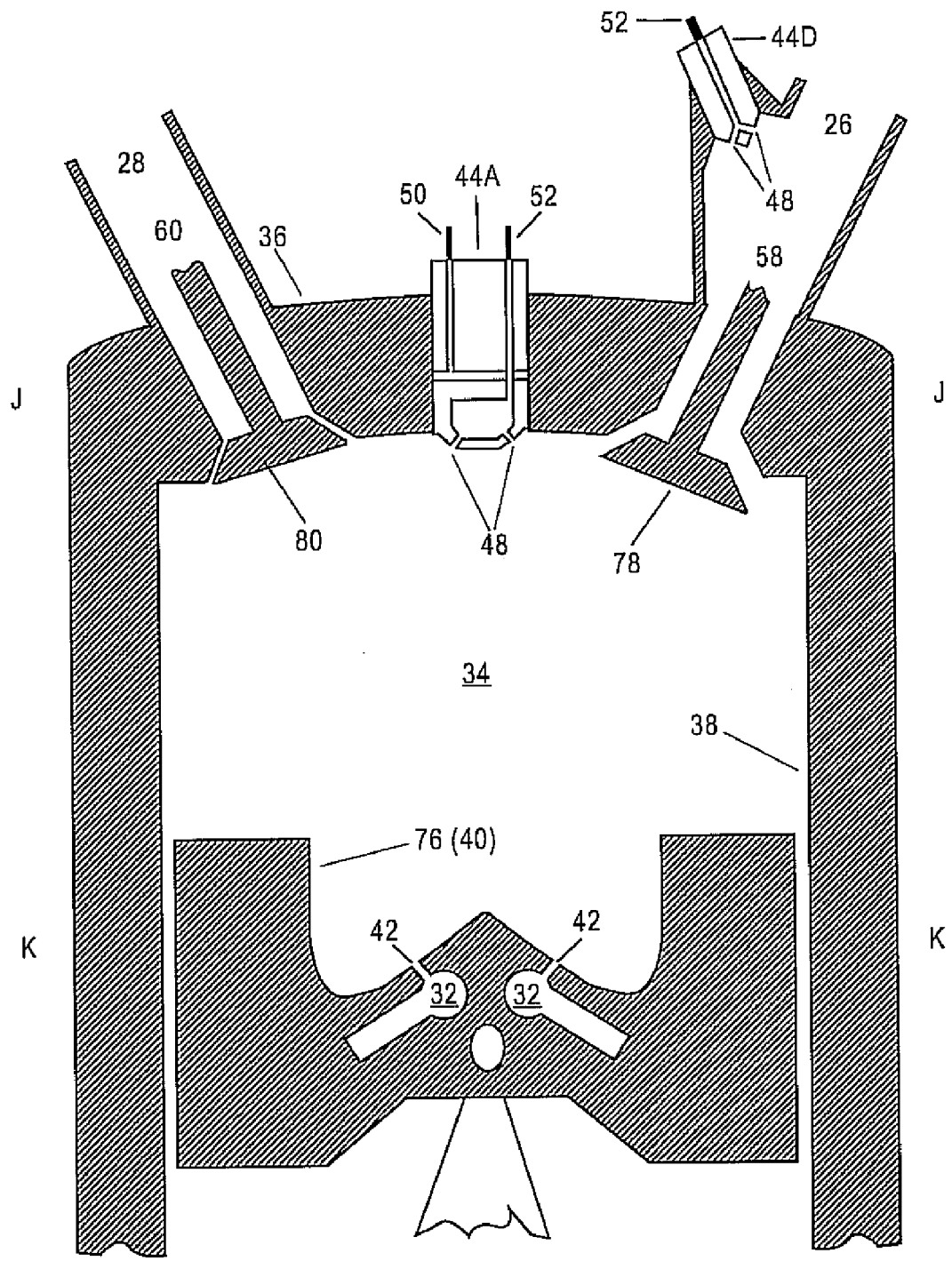
FIG. 6B depicts a schematic of internal axial cross section diagram (through lines J-J and K-K) of one engine combustion cylinder of the HRCI Four-Stroke Reciprocating Engine shown in FIG. 6A utilizing the HCRI process.
Figure 6C:
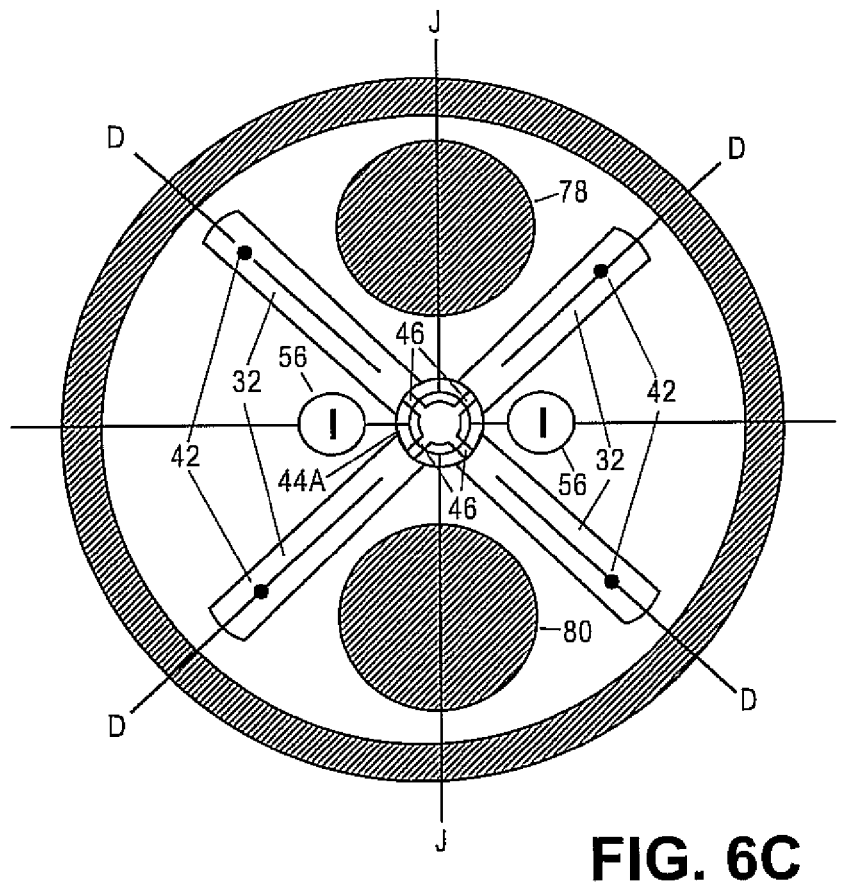
FIG. 6C depicts a schematic diagram of internal top (radial cross section through the cylinder head including lines D-D and J-J) of one engine combustion cylinder of the HRCI Four-Stroke Reciprocating Engine shown in FIG. 6A using the HCRI process.

There are two axial cross-section views of HCRI engine 500 depicted. FIG. 6A is an axial cross-section passing though lines D-D that highlights the positioning of the top housing periphery mounted control-active M-C's 32. FIG. 6B is an axial cross-section passing though the plane containing lines J-J and K-K. This figure highlights the positioning of an intake valve 78 and an exhaust valve 80. The intake gases 66 from the engine intake manifold 26 can enter the main chamber 34 via the intake valve 78 and the exhaust gases 68 from the main chamber can exit to the exhaust manifold 28 via the exhaust valve 80. The inclusion of the general intake-gas entry device fuel insertion device 44D to insert fuel directly into the engine intake manifold 26 (of the intake-gas entry device 58) is also shown in FIG. 6B.

Figure 6D:
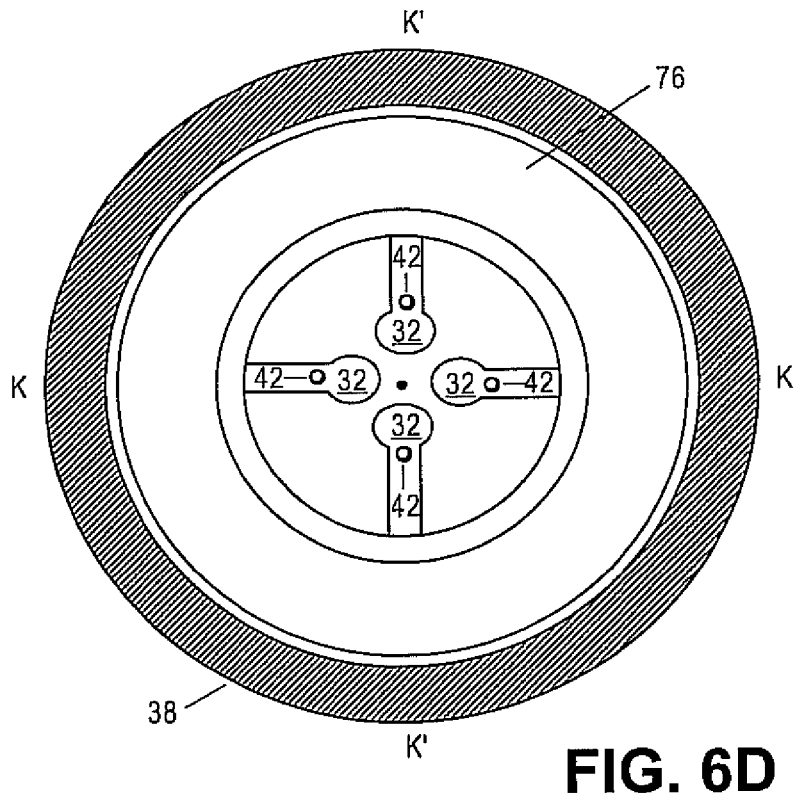
FIG. 6D depicts a schematic diagram of internal bottom (radial cross section of bottom including lines K-K) of one engine combustion cylinder of the HRCI Four-Stroke Reciprocating Engine shown in FIG. 6A using the HCRI process.

There are also two radial cross-section views. The first is FIG. 6C, which is a top down view of the top periphery 36. The plane of this view passes through lines D-D (of FIG. 6A) and line J-J (of FIG. 6B). As seen via FIG. 6A, the same dual-fluid injector 44A feeds control fluid to four control-active M-C's 32. As with FIG. 6A and FIG. 6B, this figure (FIG. 6C) is a functional schematic, not a detailed or scaled depiction. The second, FIG. 6D is a schematic of his engine's simple piston 76 arrangement when the piston is near its BCD (bottom dead center) position. This is again a functional "top down view" representation, not a precise radial cross-section.

HCRI engine 500 is another example in which control-passive M-C's 32 are mounted in the movable work-power producing component 40. The arrangement of these passive chambers is make clear by comparing FIG. 6B and FIG. 6D. From FIG. 6D it is understood that four passive M-C's 32 are symmetrically arranged in the central section of the bowl of the piston 76. Though their function is very different, the positioning of these piston-mounted passive-control M-C's 32 is very similar to the optimum positioning of the "air-cells" in SAE Paper No. 952359 (Reitz, et. al.). In this earlier work the inlet/exit conduits to the air cells were constructed with much larger diameters so that there is no radical species generation in the engine. SAE Paper No. 2007-01-0013 (Blank) highlights the ability of HCRI engine 500 to make use of valve actions and extra valve actions facilitated via use of special valve travel schedules to assist in the transfer of RI species between the M-C's 32 and the main chamber 34.

As in exemplary HCRI engine 200, the HCRI engine 500 can be configured with various RI-species generation-control augmentation devices (54, 64 and 70) and exhaust-gas recycling devices 62. An example of the use of the mini-chamber RI-species generation-control augmentation device 54 for sole control of the timing of combustion in a 4-stroke HCRI engine embodiment that is very similar to HCRI engine 500 is given in SAE Paper No. 2007-01-0047 [Blank]. An example also applicable to HCRI engine 500 of the combined and coordinated use of the exhaust-gas recycling device 62 and the exhaust-gas RI-species generation-control augmentation device 64 is given in Joint SAE Paper No. 2007-01-1887 and JSAE Paper No. 20077212 (Blank). The electronic engine control system 30 regulates these and the various fuel and control fluid inserters (44A, 44C and 44D) and the ignition-timing augmentation devices 56. This regulation via control system 30 is in manners appropriate the range of operating conditions for HCRI engine 500. Thus HCRI engine 500 can both use and enable the two full HCRI and the four RIS-augmentation embodiments of the HCRI process 100.

It should be readily apparent to those of ordinary skill in the art that exemplary HCRI engine 500 as depicted in FIG. 6A-6D represents a generalized 4-stroke reciprocating piston engine schematic illustration, and that in addition to those mentioned, other components can be added or existing components can be removed or modified. In addition, many other 4-stroke reciprocating piston engine HCRI engine embodiments of HCRI engine 500 are possible that are also capable of both enabling and using the HCRI process 100.

Figure 7A:
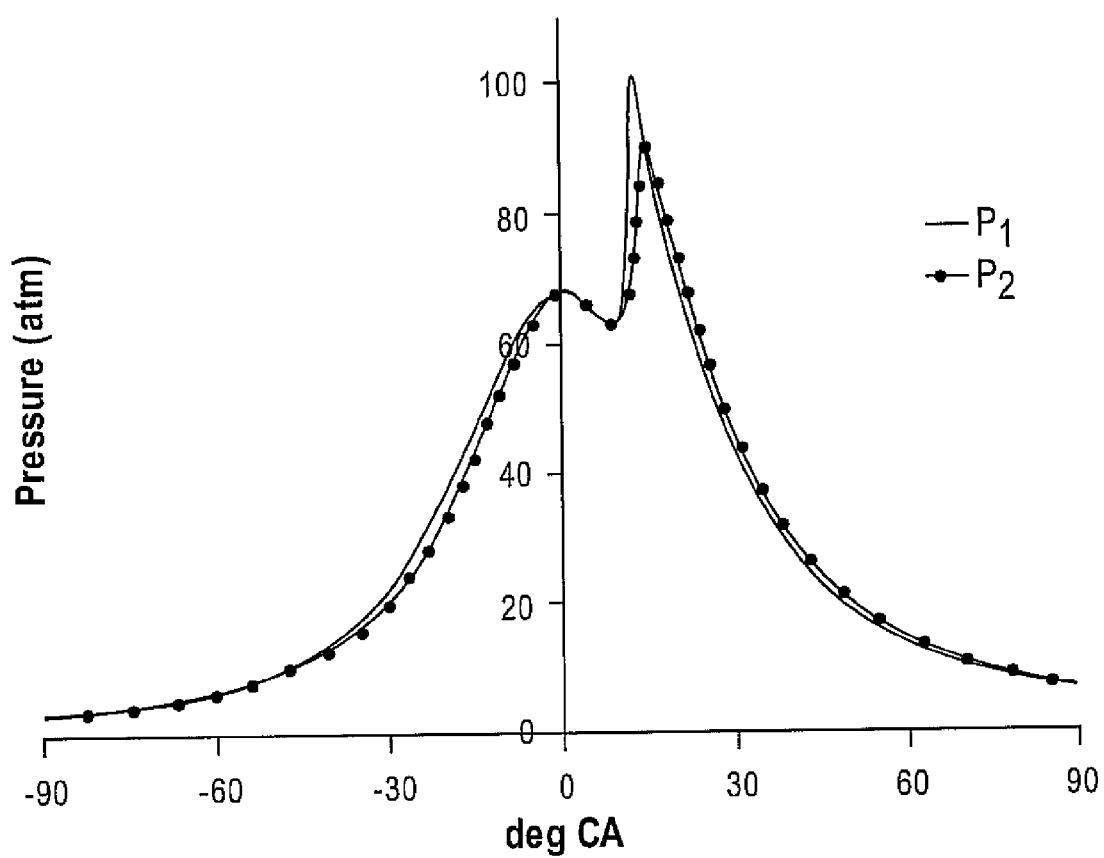
FIG. 7A is a graph showing sample Pressure vs. Crank Angle ("CA") values for the primary and secondary chambers of a Full DI HRCI Four-Stroke Reciprocating Engine for $C_2H_5OH$ Fuel and a 17.5:1 CR ($P_1$-Main Chamber, $P_2$-Mini-Chamber).
Figure 7B:
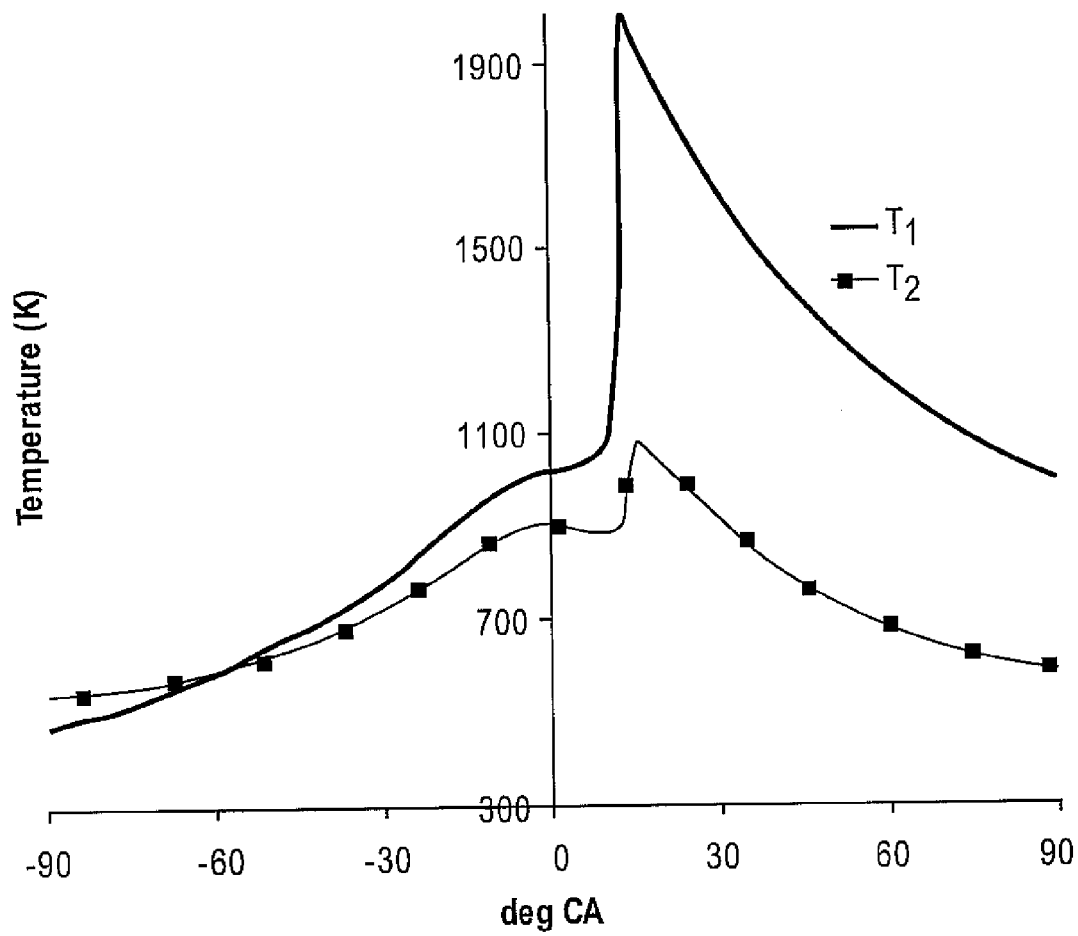
FIG. 7B is a graph showing sample Temperature vs. Crank Angle ("CA") values for the primary and secondary chambers of a Full DI HRCI Four-Stroke Reciprocating Engine for $C_2H_5OH$ Fuel and a 17.5:1 CR ($T_1$-Main Chamber, $T_2$-Mini-Chamber).

Full DI HCRI process embodiments of HCRI process 100 within these three HCRI engine embodiments of HCRI engine 200 show universally similar pressure and temperature trends during the portion of HCRI process between a little before event 2, 110 and a little after event 8 140 of FIG. 1. Example plots for these two properties of the combustion are given in FIG. 7A-7B for the main chamber 32 and the control-active mini-chambers 34 for the 4-stroke reciprocating IC engine studied in SAE Paper No. 2007-01-0623 (Blank). This engine is similar to HCRI engine 500 except that it has no control-passive M-C's 32 in the piston 76. Important to note from FIG. 7A is the rapid drop off in the pressures in both the main chamber 34 and the M-C's 32 immediately following TDC (0 degrees of CA). This indicates that compression alone has not provided nearly enough heat for self ignition of the main chamber gases. Thus, were it not for the OH—RI species empowered exothermal pre-ignition activity occurring after TDC (as described above for event 7 135 of FIG. 1), a misfire would certainly have resulted. However, FIG. 7B shows that during this period, despite the drops in pressures (in both chambers 34 and 32), the temperature is rising in the main chamber 34 due to this pre-ignition activity. Thus, robust autoignition occurs at 11 degrees of CA after TDC.

In general and simplistic terms, with a given fuel, the criteria for homogenous combustion autoignition can be considered to be dependent on the combination of five factors:

$$AI_{HC,crit} = F[a^*T_{mix}/T_{eff}; b^*G(A/F_{rat}); c^*R_{conc}; d^*(1.0-D_{mix}); e^*R_{res}] \quad (6)$$

Interpreted as being relevant for understanding, this general criteria implies that the circumstances under which homogeneous combustion autoignition will occur ($AI_{HC,crit}$) is roughly based on the weighted amalgamation (not the sum) of the following key factors: the temperature of the air charge-fuel mixture ($T_{mix}$), the air to fuel ratio of the mixture ($A/F_{rat}$), the initial (i.e., prior to the point of the start of RI species pre-autoignition activity during compression) combined concentration of select RI species in the air charge-fuel mixture ($R_{conc}$) the degree of mixing of the air charge-fuel mixture (at the global/chamber level) ($D_{mix}$) and the reactive RI species residence time with the fuel after the fuel is sufficiently mixed ($R_{res}$). $T_{eff}$ is the temperature corresponding to the "effective" charge CR for the given fuel and $A/F_{rat}$ of the main chamber mixture. Depending on the fuel, the $A/F_{rat}$ and the inlet conditions of the charge, etc., $T_{eff}$ is in turn based on the "effective" charge CR. Thus $T_{eff}$ corresponds to that temperature needed for a given fuel and $A/F_{rat}$ for autoignition by CI alone. The leaner the $A/F_{rat}$, the higher the $T_{eff}$ required for homogenous autoignition to assuredly occur. A misfire will occur if this general criterion is not met during the cycle (and usually by sometime not much after TDC). There are a number of other factors neglected in this simplified explanation.

In full PCCI (and thus without the use of any RI species from a previous cycle) the formulation for autoignition is simply $AI_{HC,crit} = a^*T_{mix}/T_{eff}$. By definition of terms, for a given air-fuel ratio $A/F_{rat}$ and fuel, autoignition will occur for PCCI as $T_{mix}/T_{eff}$ reaches 1.0. Thus, for this case the criteria for autoignition is reached when $AI_{HC,crit} = a$.

General Distinctives of full HCRI Engines: The main difference between the full HCRI engines and the RIS-augmented engines of HCRI process 100 is the extent of the use of the RI species. The generalized process embodiment of the thermo-fluid chemical-kinetics process for radical ignition (HCRI process 100) as illustrated in FIG. 1 and as implemented via HCRI engine 200 (FIG. 2A-2B) has been defined and described in the foregoing with both the full HCRI embodiments and RIS-augmented embodiments in mind. Thus, though this earlier discussion is tilted more toward the full HCRI case, it is not exclusive to this case. Also, because of its inclusiveness, this earlier discussion gives limited attention to the distinctives of the two full HCRI sub-cases themselves.

Though the general full HCRI engine of HCRI process 100 can employ manifold (or carburetor) fuel insertion, direct fuel injection or a combination of the two, embodiments with only the DI of the fuel provides better overall efficiencies. Also, the HCRI IC engine embodiments of the DI fuel full HCRI sub-case can enable slightly better SOC control than the premixed fuel full HCRI sub-case. However, in both sub-cases of full HCRI, the appropriate maximum use of RI species is employed to both pre-induce and induce autoignition. Thus, as in conventional PCCI, the combustion in the full HCRI process embodiments is homogeneous. This is in sharp contrast to the time-extended diffusion reaction processes occurring during both SI combustion (with its flame front combustion) and DI CI combustion (with its premixed and turbulence-mixing phases) (*Internal Combustion Engine Fundamentals*, 1988 [Heywood]).

In general, the value for $R_{res}$ is controlled primarily via two factors: the time that the RI species become reactive and the fuel insertion timings: start and duration. Thus this value remains zero until two things happen: (1) there has been some fuel insertion that has become effectively mixed with the other main chamber gases, and (2) the RI species have become meaningfully reactive. Further, for both full HCRI sub-cases, the degree of RI species augmentation ($R_{conc}$) is understood to be at it maximum value ($R_{conc,max}$).

In comparison to the general criteria for homogeneous combustion given by Equation (6), for the DI full HCRI sub-case (herein called the "DI-HCRI" process embodiment of HCRI process 100) $T_{mix}$ need not reach $T_{eff}$ before autoignition is assured. For a given fuel and a given air-fuel ratio $A/F_{rat}$, the autoignition criteria may even be met if/when $T_{mix}$ reaches a value that is markedly less than $T_{eff}$ (with autoignition itself starting to take place at typical temperatures of 100-150° C. lower than $T_{eff}$). Also, the value for $D_{mix}$ need not be at its maximum value of 1.0, though it should normally be moderately close for the combustion to be homogeneous.

For the DI-HCRI sub-case of fall HCRI, at various mass locations in the moving main chamber gases, RI species residence time starts as the fuel, oxygen and RI species become mixed at the lowest turbulent length scales. Compression causes $T_{mix}$ to rise. The quantity of fuel insertion is set according to a given engine speed and engine load so that the air charge-fuel mixture still remains leaner (than typical of conventional PCCI and DI CI engines). The CR of the engine is set lower than that required for attaining $T_{eff}$ (corresponding to the $A/F_{rat}$ and intake gas conditions of the charge mixture, etc.). The initial RI species concentration $R_{conc}$ and the overall average (global average) of the RI species residence times $R_{res}$ (controlled primarily via the fuel insertion timings: start and duration) are coordinated with the temperature rise (due to compression and pre-autoignition chemistry) and the mixing rate in such a way so as to ensure that ignition occurs at the desired time.

For the DI-HCRI sub-case we can think of these factors as being set so that the criteria for autoignition for a given air-fuel ratio $A/F_{rat}$ and a given fuel is $F[a^*T_{mix}/T_{eff}; c^*R_{conc,max}; d^*(1.0-D_{mix}); e^*R_{res}]$. Thus autoignition occurs for DI-HCRI when this function reaches a. Stated in semi-analytic form, for DI-HCRI:

$$\{AI_{HC,crit}\}_{DI-HCRI} = F[a^*T_{mix}/T_{eff}; c^*R_{conc,max}; d^*(1.0-D_{mix}); e^*R_{res}] = a \quad (7)$$

where a is the necessity value for autoignition in the conventional PCCI formulation (corresponding to the "effective"

charge CR for conventional PCCI). Whereas for understanding purposes, the three other coefficients may be simplistically viewed as constants, in reality they (c, d and e) are non-linear functions of $T_{mix}$, $R_{conc}$, $D_{mix}$ and $R_{res}$. It is noted that $R_{conc,max}$ is the initial concentration of the key RI species and is not changing during the pre-ignition process.

Thus, over an engine's entire operating regime in the DI-HCRI process embodiment of HCRI process 100, combustion control in the main chamber 34 is strictly maintained through RI species by a combination of means. The two main means of controlling the "effective" SOC in the DI-HCRI process embodiment of HCRI process 100 are: (1) the precise regulation of the quantity (mass per engine combustion cylinder) of RI species generated and passed on to the next cycle and (2) the amount of residence time these RI species are allowed with the fuel in the main chamber 34 prior to ignition.

In the premixed charge full HCRI sub-case (herein called the "PC-HCRI" process embodiment of HCRI process 100) all of the fuel injection can be into the general intake-gas entry of HCRI process 110) all of the fuel injection can be into the general intake-gas entry device 58 (as is typical in conventional HCCI) or there can be some combination of this and DI into the main chamber 34 at timings typically earlier than the start of the main-compression event. In all incidences of this premixed fuel sub-case, the autoignition criterion is ideally insensitive to $D_{mix}$ (which is in any case generally constant at its maximum value of 1.0 well before the SOC). Thus, for a PC-HCRI process embodiment of HCRI process 100, the criteria for autoignition for a given air-fuel ratio $A/F_{rat}$ and a given fuel is:

$$\{AI_{HC,crit}\}_{PC-HCRI}=F[a*T_{mix}/T_{eff}; c* R_{conc,max}; e*R_{res}]=a \quad (8)$$

where a is again the necessity value for conventional PCCI autoignition. In this process, the regulation of the RI species-fuel residence (interaction) time ($R_{res}$) is not an available option in the control strategy. Control over the timing of the SOC is primarily via regulation of the quantity of RI species generated in the previous cycle(s) and conveyed to the main chamber 34.

It is emphasized that the above depictions of the criteria required for autoignition for these two full HCRI process embodiments of HCRI process 100 are simplistic. Nonetheless, for the purpose of comparing these fuel HCRI embodiments of HCRI process 100 with the RIS-augmented PCCI and RIS-augmented DI CI embodiments of HCRI process 100, the understanding provided by the above descriptions is adequately sufficient.

Subject to the applicable portions of the earlier general descriptions, the IC engine embodiments schematically depicted in FIG. 2A-2B (for HCRI engine 200), FIG. 4A-4D (for HCRI engine 300), FIG. 5A-5C (for HCRI engine 400) and FIG. 6A-6D (for HCRI engine 500) are all examples of engine configurations capable of using and enabling the DI-HCRI and PC-HCRI process embodiments of HCRI process 100. A general means exist for the operation of all three of these IC engine embodiments (300, 400 and 500) as full HCRI process embodiments. This general means is the operation of the generalized process embodiment of the general thermo-fluid chemical-kinetics process invention (HCRI process 100) in the exemplary IC engine embodiment (HCRI engine 200) provided earlier in detail and applied to the general distinctions of these two full HCRI process embodiments. In the interest of both brevity and clarity, the description of some of the common features of operation in the three example IC engine embodiments (HCRI engine 300, HCRI engine 400 and HCRI engine 500) are thus omitted and the description of these features of operation with respect HCRI process 100 depicted in FIGS. 1 and its detailed description of operation in HCRI engine 200 are being relied upon to provide adequate descriptions of the common features of operation omitted. In particular, the thrust of the HCRI process 100's detailed description is applied to full HCRI, and its description, as given, fully explains both the DI-HCRI and the PC-HCRI process embodiments of HCRI process 100.

Further, for clarity of the general description, the aims of the engine electronic control system 30 must be considered in the operation of the HCRI engine 200 and its three example HCRI IC engine embodiments (300, 400 and 500) as either the DI-HCRI process embodiment of HCRI process 100 or the PC-HCRI process embodiment of HCRI process 100. The engine electronic control system 30 must ensure the total amount and timings of fuel inserted into the main chamber 34, the timings and amounts of control insertion into the M-C's 32 and the use of all RI-species generation augmentation-control devices 54, 64 and 70 (if any or all are employed) are all consummated with the engine operating conditions and specifications in manners that are appropriate to these two full HCRI embodiments. For the both the DI-HCRI process embodiment and the PC-HCRI process embodiment the total amount of RI species generated, carried over, recycled and conveyed to assist ignition is that amount needed to fully dominate the autoignition event, resulting (in comparison with the conventional ignition modes) in reductions in required heat and required fuel concentrations relative to oxygen concentrations for the ignition of the fuel. Also these control devices are to be operated in ways that together ensure autoignition at the desired time and so that the work-power output of the engine is in accordance with operational load and speed requirements The HCRI process 100 is not an "either-or" technology. In full HCRI IC engine embodiments (those using DI-HCRI and PC-HCRI), RI is used exclusively so as to make optimum use of the HCRI process 100's unique "full HCRI" process advantages. However, HCRI process 100 can also be used to augment and improve other conventional technologies. Thus, the remainder of this section provides details of four main RIS-augmentation applications of the HCRI technology. These are presented as additional process embodiments of HCRI process 100 as depicted in FIG. 1 and are described generally as embodiment permutations of HCRI engine 200 depicted in FIGS. 2A-B. Two of these embodiments involve ignition via CI and two involve ignition via SI. Alternatively, two of these embodiments involve premixed charges and two involve the DI of the fuel.

General Distinctives of the RIS-Augmented PCCI Embodiments: Among the drawbacks associated with conventional PCCI (HCCI and SCCI) are the difficulties in extending homogenous combustion via CI to the entire operating regime of an engine. Also, within the engine operating regimes where PCCI utilization can be made effective, there are difficulties associated with controlling the SOC. To accomplish the latter, extensive controls are typically necessary, usually using multiple sensors, extensive sensor directed logic and combustion-history aided management.

Conventional PCCI primarily relies primarily on only two of the several main factors available for the control of autoignition for homogeneous combustion. One of these factors is the requirement that the fuel and air be mixed thoroughly at the lowest turbulent length scales. By definition, in PCCI this is accomplished simply by pre-mixing of the fuel with the air charge long before the point of SOC. The second factor is the thermal (or "effective" charge CR) requirement. For autoignition to occur at a specific time, the mixture must (at that time) have been brought to the precise "effective" charge CR applicable for the engine combustion cylinder's starting charge conditions. If the effective charge CR is the same as the "mechanical compression ratio of the engine", then combustion will occur at the desired time.

As discussed earlier, in general PCCI autoignition relies on "low" temperature CI chemical-kinetics sub-mechanisms that start with fuel-oxidation chain-initiation reactions at substantially higher temperatures (though called "low" temperatures) compared to the "lower" temperatures involved in full HCRI (SAE Paper No. 2007-01-0047[Blank], SAE Paper No. 2007-01-0135[Blank] and SAE Paper No. 2007-01-0623 [Blank]).

The combustion of a fuel with PCCI also involves the use of RI species. However, it is normally only after the start of these fuel-oxidation chain-initiation reactions (at the higher "low" temperatures) that the concentrations of the RI species begin to build up and accelerate. Soon afterwards in PCCI the RI species begin to sacrifice themselves at higher temperatures to produce an abundance of the radical $OH^-$.

This stands in contrast to the general "lower" temperature "OH—RI species" driven fuel decomposition sub-mechanism for autoignition employed in the full HCRI ignition process, where, due to the carry-over, the recycling and the conveyance of the RI species generated during previous cycles, the RI species are already present in the charge in relative abundance. Thus, the higher "low" temperatures (or higher "effective" charge CR's) associated with PCCI are not needed for the production of these species. The pre-ignition and ignition processes (with a given fuel) in full HCRI IC engines (both DI-HCRI and PC-HCRI) are dominated by the sub-mechanisms given in events 6 130 and 7 135 of FIG. 1 at below "lower" and "lower" temperatures, respectively. At these lesser temperatures, during pre-ignition $HO_2^-$ is used in dominant chain-initiation reaction Equation (1). Also a supply of $OH^-$ is generated via chain-initiation reaction Equation (2) from the carried over and pre-ignition generated $H_2O_2$ supply. This reaction (Equation (2)) is highly exothermic and eventually becomes the dominant reaction driving RI species induced autoignition (RI). The $OH^-$ is predominantly used during pre-ignition and autoignition in dominant chain-branching reaction Equation (3).

Despite its starting the relatively lower temperatures, this general RI chain-initiation and chain-branching reaction process for full HCRI is significantly faster than the general direct-$O_2$ fuel oxidation driven chain-initiation (and chain-branching) reaction processes of PCCI starting at the higher "low" temperatures. And when these two chemistries are joined to enable the RIS-augmented PCCI process embodiment (hereinafter called a "RIS-PCCI" process embodiment of HCRI process 100), many of the problems associated with "conventional" PCCI are overcome.

Depending on the degree of augmentation, in the RIS-PCCI process embodiment (as in fill HCRI), $OH^-$ is generated by highly exothermic reaction Equation (2) in the main chamber 34 from the pre-supplied $H_2O_2$ (carried-over, the recycled and conveyed by the HCRI process 100) well prior to RIS-PCCI autoignition. Though the mechanisms are rather complex, the other RI species also greatly help in accelerating this much earlier (than in conventional PCCI) $OH^-$ generation. Also, during much of this pre-ignition process the concentrations of all RI species generally grow. In addition to the internal energy provided by exothermal reaction Equation (2), the $OH^-$ radical is then used to generate additional internal energy via chain-branching reaction Equation (3) and the general sub-mechanisms that are activated via the availability of the various $R_i^-$ radicals. Thus, as in full HCRI, in RIS-augmented PCCI the $R_i^-$ radical is created during the early autoignition activity (but in lesser quantities, depending on the degree of RI species augmentation).

The main characteristic of the RIS-PCCI process embodiment that distinguish it from the PC-HCRI process embodiment is the fact that not enough of the RI species are initially present in the main chamber 34 in sufficient quantities ($R_{conc}$) to cause fall RI. Yet enough RI species are initially present to promote their own growth rates and to in turn feed the exothermic reaction sub-mechanisms to sufficiently raise the temperature of the main charge up to or near the new RIS-PCCI value of $T_{eff}$ so that the conventional sub-mechanisms (those primarily involving fuel oxidation reactions at higher "low" temperatures) can take over. Thus the criterion for eventual autoignition is set by a combination of RI and PCCI.

For a given air fuel ratio $A/F_{rat}$ and fuel type, the essential criterion is met for the RIS-PCCI process embodiment when:

$$\{AI_{HC,crit}\}_{RIS-PCCI}=F[a*T_{mix}/T_{eff}; c*R_{conc}; e*R_{res}]=a \qquad (9)$$

where (as in cases before) a is the necessary value corresponding to the "effective" charge CR (and thus a function of all the factors affecting the "effective" charge CR for the given fuel and $A/F_{rat}$). Thus, here a is again the necessity value for conventional PCCI autoignition. Whereas, the three weighting functions may again be simplistically viewed again as constants, the weighting factors a, c and e (as well as $T_{eff}$) are in reality be non-linear functions of $T_{mix}$ and $R_{conc}$. As with full HCRI, changes in $T_{mix}$ are not brought about by compression alone, but by a combination of compression and pre-ignition activity initiated by the presence of the RI species (as well as other species). The only difference between the PC-HCRI process embodiment and the RIS-PCCI process embodiment is that the degree of RI species augmentation. The value of $R_{conc}$ is less than the value $R_{conc,max}$.

Increased control over the timing of autoignition in RIS-PCCI process can be gained in the following way. First, the $A/F_{rat}$ is kept leaner than in conventional PCCT. Because of this the value of $T_{eff}$ is raised (to a value higher than that needed for conventional PCCI under its typically less lean conditions). The criteria for assured autoignition is in any case not as sensitive to $T_{mix}$, but is driven also by the values of $T_{mix}$, $R_{conc}$ and $R_{res}$. During pre-combustion the presence of the RI species influences the rise in $T_{mix}$ itself via the "lower" temperature sub-mechanisms. Thus, depending on the degree of augmentation, though some percentage of the later pre-autoignition chemical-kinetics process may still be via the higher "low" temperature fuel oxidation sub-mechanisms (generally associated with conventional PCCI), the remainder of the chemical-kinetics is due to the earlier pre-ignition and ignition processes via the same sub-mechanisms associated with PC-HCRI process embodiment. And it is the sequenced use of these two sub-mechanisms (and thus the additional chemistry made possible by the initial presence of the RI species) that enables the enhanced control of the timing of the autoignition in RIS-PCCI engines.

Alternatively and less preferably, the RIS-PCCI process can be controlled by lowering the CR of the engine, rather than making the $A/F_{rat}$ leaner. In this case the value for $T_{eff}$ is not raised. Obviously, because of the lower CR, compression itself will not be able to bring the charge to $T_{eff}$. Yet, the RI species activity again serves to supplement the autoignition process by providing the additional internal energy required to bring $T_{mix}$ up to the conventional PCCI $T_{eff}$ value. Obviously, a third option for controlling the RIS-PCCI process is by both lowering the CR (but not as much) and making the mixture leaner (but not as lean).

For completeness, it should be mentioned that to the degree that there is RI species augmentation, there will most always be some proportional drop in the actual temperature at which autoignition takes place (below $T_{eff}$, the value required in equivalent conventional PCCI engines for autoignition). This is because, in the RIS-PCCI process embodiment of HCRI process 100, the effect of the RI species pre-ignition chemistry is more than just in adding internal energy to the main charge by the recycling of the exhaust gases (as in the case of PCCI). This pre-ignition chemistry results in the creation of more of the main precursor species required for autoignition. Many of these precursor species are ultimately required in autoignition. These species are used/required in both the higher "low" temperature fuel oxidation sub-mechanism of conventional PCCI and in the "lower" temperature OH—RI species driven fuel decomposition chain-initiation and chain-branching sub-mechanism of the PC-HCRI process embodiment of HCRI process 100. In RIS-PCCI, after the completion of some of the same sub-mechanisms associated with the PC-HCRI process embodiment of HCRI process 100 at the "lower" temperatures (and resulting in internal energy generation), there are also actually both more key RI species and more $OH^-$ present than in conventional PCCI. In conventional PCCT operations these RI species and $OH^-$ could not be present in such meaningful quantities at these "lower" temperatures, but are generated primarily as the charge gets close to attaining $T_{eff}$. Thus, the initial presence of these RI species results in a general but very complex hybrid sub-mechanism.

General Distinctives of the RIS-Augmented DI CT Embodiments: As an augmentation to conventional CT DI engines (i.e., Diesel engines), HCRI process 100 can enable autoignition and more complete follow-on combustion at conventional diesel CR's but under leaner conditions. The resulting new art RIS-augmented DI CI embodiment (hereinafter called a "RIS-DICI" process embodiment of HCRI process 100) has advantages over conventional DI Diesel engines with or without EGR.

In conventional DI CI engines (with or without EGR) the autoignition and subsequent combustion of the fuel is in two phases (the premixed phase and the mixing-control phase). In both phases the process reactions occur via high temperature oxidation and/or dissociation sub-mechanisms. In the premixed phase the autoignition and premixed combustion is controlled more by chemical kinetics. The charge is typically brought to temperatures that are above the value of $T_{eff}$ (corresponding to the conventional PCCI case) by compression (but not usually with the help of the thermal component of the EGR—which if used is typically cooled) prior to injection of the fuel. Afterward, during the mixing control phase the combustion of the remaining fuel is controlled more by the turbulence mixing levels at the high temperatures of the charge. Diffusion thus plays a major role in both phases. Unfortunately, this combustion sequence serves also to maximize the formation of nitric oxides. As the process continues and oxygen becomes locally depleted (to the extent that the diffusion and turbulent mixing can not keep up), if the fuel consists of large molecules it may be pyrolized to generate soot as it approaches the high temperature zones in the absence of oxygen.

In the RIS-DICI process embodiment of HCRI process 100 the RI species are instead premixed with the oxygen stream and serve within this stream as "combustion enhancers" so that the diffusion combustion in the first phase and also normally (but not necessarily always) in the second phase (depending on the fuel, the operating conditions and the degree of RI species augmentation) can both occur under leaner (rather than under stoichiometric) conditions. Thus the engine can be (and typically is) operated at higher $A/F_{rat}$'s. The increased leanness of the fuel lowers the peak flame temperatures and helps reduce the overall production of $NO_x$.

When slightly-to-moderately lower than normal conventional DI CT CR's are used, the criteria for autoignition for the RIS-DICI process embodiment is nearly identical to that for fall DI HCRI, except that the air fuel ratio ($A/F_{rat}$) is growing with time after the SOI. Thus, instead the most general criteria applies, namely:

$$\{AI_{HC,crit}\}_{RIS-DICI} = F[a*T_{mix}/T_{eff}; b*G(A/F_{rat}); c*R_{conc}; d*(1.0-D_{mix}); e*R_{res}] = a \quad (10)$$

In this case (with slightly-to-moderately lower than normal conventional DI CI CR's), depending on the CR, fuel insertion can be earlier and there can be more mixing of the fuel before autoignition occurs. The continuation of fuel insertion can be (and generally is) such that the EOI still occurs sometime after the SOC. During autoignition itself, as a flame becomes established in the envelopes surrounding the sets of droplets still being inserted and driven across the main chamber 34, the RI species assist the diffusion-combustion processes taking place in these fronts. Just as not all of the oxygen is consumed in the first phase, normally also not all the RI species are consumed during this first phase. And because the RI species and oxygen are well mixed with each other prior to autoignition, the remaining RI species continue to operate together with the unused oxygen streams. These remaining RI species are thus available to assist in the next part of the cycle, the mixing-control phase. Thus, in the mixing-control phase diffusion, the combustion also can and generally does occur under slightly-leaner than normal (conventional) DI CI engine air-fuel ratio conditions.

However, when normal DI CI CR's are used and the SOI (start of injection) occurs only after $T_{mix}$ has reached (or nearly reached) $T_{eff}$, the role of the RI species in autoignition is different. In this case they have little effect on the timing of autoignition (which is instead set by injection timing). Instead they serve in making the autoignition more rapid, with more stable flame envelopes forming around the sets of inserted droplets. The RI species assist the diffusion combustion process occurring under substantially leaner conditions in both of the cycle's combustion phases (leaner in comparison with "conventional" DI CI engines).

Regardless of the whether or not lower CR's are used, both within the premixed and the mixing-control phases, the reactions given by Equation (2) and Equation (3) play major roles. Like in the RIS-PCCI process embodiment of HCRI process 100, the higher temperature fuel dissociation and oxidation sub-mechanisms normally associated with both combustion phases of conventional DI CI are accordingly modified. A generalization of the modified sub-mechanism with various fuels are complex pseudo-hybrids of the general sub-mechanisms associated with conventional DI CI pre-ignition, ignition and combustion and the sub-mechanisms associated with full DI HCRI pre-ignition and autoignition. The degrees of modification are comparative to the degrees of RI species augmentation.

Also, during power-expansion high-speed RI species laden jets are emitted from the mini-chambers. Among other things, these jets carry additional RI species and oxygen. They also serve to generate relatively enormous turbulence levels. Thus, though the presence of the original main chamber RI species (from the previous cycle(s)) has already served to nullify most of soot formation (by increasing the efficiency of the combustion process), when properly aimed, these jets also help to farther demolish any pockets of soot that may have inadvertently been formed.

Finally, it should be mentioned that the conventional DI CI ignition mode must rely on the momentum of the spray to drive the flame across the compressed air charge. This requires that the fuel for DI CI have a relatively high cetane number (i.e., that they auto-ignite relatively fast) so that the premixed phase combustion can keep up with the injection flow rate. Otherwise (with lower cetane values), there could be excessive noise, and under certain operating conditions there could be knocking. However, (as shown in SA-E Transaction Paper No. 2004-01-1677 [Blank] and SAE Paper No. 2004-01-1847 [Blank], which is incorporated by reference) the presence of the RI species in sufficient quantities serves as a cetane enhancer.

General Distinctives of the RIS-Augmented PCSI Embodiments: Among the problems associated with the use of conventional PCSI (HCRI) are the difficulties at the limits of PCSI operating regime, namely knock at high loads and throttling at low loads. While comparison of the chemical-kinetics of the ignition of fall HCRI engines with the ignition of conventional PCSI engines is more difficult than its comparison with the ignition of conventional PCCI engines, some of the forgoing discussion concerning the RIS-PCCI process embodiment can be extended to RIS-augmented PCSI.

Similar to conventional PCCI and RIS-PCCI, neither conventional PCSI nor RIS-augmented PCSI hereinafter called "RIS-PCSI" of HCRI process 100) involve diffusion-flame combustion. Similar instead to conventional DI CI, the combustion within the flame front in conventional PCSI occurs at "higher" temperatures relative to the "low" temperatures of conventional PCCI and the "lower" temperatures of full HCRI. However, because the SOC for both conventional PCSI and RIS-augmented PCSI is due to a spark, a comparison for the criteria for autoignition can not be made. Also PCSI primarily involves a flame front to propagate the combustion and is not as much dependent on either chemical-kinetics or turbulent mixing.

Depending on the fuel, conventional PCSI uses higher temperature fuel dissociation (thermal and/or via third body) and fuel oxidation chemical-kinetics sub-mechanisms. Nonetheless, the effect of the presence of the RI species in the RIS-PCSI process embodiment is analogous to the effect of the RI species in the RIS-PCCI process embodiment. The ignition sub-mechanism in the RIS-PCSI process embodiment is again a semi-sequenced highbred sub-mechanism, though one that generally happens somewhat faster than the highbred ignition sub-mechanism in the RIS-PCCI process embodiment.

A simplistic way to visualize the effect of RI species in the RIS-PCSI process embodiment is to see these RI species as being responsible for increasing two things. First they increase the ignitability of the fuel. Secondly, their presence increases the rate of combustion of the fuel-air mixture within the flame front. And depending on the fuel, the CR and the air-fuel ratio, there can be a third effect outside the flame front.

Equation (2) and reaction Equation (3) both occur over a range of temperatures that include the "lower" temperatures of full HCRI and the "higher" temperatures of conventional SI. Thus, inside the front reaction Equation (2) and reaction Equation (3) play major roles in combination with the normal high temperature oxidation reaction or/and fuel dissociation mechanism of conventional PCSI. In the flame front, once the higher temperatures are finally reached, these two reactions are in any case also a part of the conventional PCSI high temperature oxidation reaction mechanism. Thus, in the high temperature mechanism of the conventional PCSI case, the RI species are in any case all also playing major roles. But, in conventional PCSI these species can only play their roles after they have been generated at the higher temperatures via the oxidation driven chain-initiation mechanism.

In the RIS-PCSI process embodiment these select RI species are instead already present and can "go to work" much sooner via reaction Equations (1)-(3) (and the other more complex sub-mechanisms typical of the RI for both the smaller and larger molecule fuel). Yet, because the temperatures become higher much more quickly (than in the case of full HCRI), mechanisms akin to those of conventional PCSI soon take over.

With the RI species already present, the combustion within the flame front is overall faster. The speed of the front varies, depending on the leanness and degree of RI species presence of the charge. Thus, while this overall new flame-front RIS-PCSI mechanism is a semi-sequenced hybrid (of the full HCRI and conventional PCSI mechanisms), it is an overall faster and a more simultaneously occurring hybrid (though not completely simultaneous) than the hybrid for the RIS-PCCI embodiment of HCRI process 100.

Due to the increased ignitability of the fuel, the air-fuel ratios ($A/F_{rat}$'s) employed over the entire engine-operating regime can be made uniformly leaner in operations with the RIS-PCSI process embodiment of HCRI process 100. Further, the ignitability of the fuel at the various loads (and thus $A/F_{rat}$'s) can then be controlled with some precision by $R_{conc}$ (the concentration of RI species in the main chamber charge). Under high loads, when much more fuel is being added, less RI species are required. The ratio of RI species to fuel can thus be controlled to insure that knock cannot normally occur. At low loads, when throttling is normally required to prevent misfire, more RI species are added instead to increase the ignitability of the charge. Thus, even without the throttling, misfire is made relatively less possible by the presence of the RI species. Also, the ratio of RI species to both the fuel and the air can be used to gain some control over the flame front propagation speed.

Finally, the hybrid of chemical-kinetics sub-mechanisms in play within the RIS-PCSI process embodiment flame front enables more rapid combustion under leaner fuel conditions. Thus, even though the local expansion (within the combustion zone) may be faster, there is generally less opportunity for the reacting particles to be expelled prematurely from the combustion zone (the degree of improvement being dependent in part on the fuel). However, reacting particles that are expelled find themselves in an environment that is quite different from what they would normally find in conventional PCSI engines. In engine embodiments using the RIS-PCSI process embodiment these particles are expelled into a relatively air-rich main chamber charge outside the front (in comparison to the stoichiometric-combustion-caused conditions of conventional PCSI). Depending on the fuel and the engine operating condition, in some cases some of the expelled incomplete combustion products can continue to burn.

General Distinctives of the RIS-Augmented DI SI Embodiments: Instead of burning controllably, gasoline normally detonates when it sees too much heat of compression, causing a sudden rise in the cylinder pressure that hammers the pistons with excessive force. This can also be true of other fuels with high octane and low cetane values. Thus, because a slow controlled burn is necessary with gasoline and other fuel with similar combustion characteristics, until the recent conventional GDI ("gasoline direct injection") means was found that insures such control via a stratified charge, DI with such fuels was not feasible.

Recent prior art DI SCSI with gasoline ("GDI") makes use of a layered fuel distribution in the main chamber charge. The charge is made rich in the vicinity of the spark plug and is then made progressively leaner as the distance from the spark plug increases. This is found to make lower load SCSI possible with gasoline without throttling under ultra lean fuel conditions. Though the spark plug initiates ignition, a varying of both the injection timings and of the injection rates within an injection is used to maintain control of the stratification. However, this prior art development cannot be extended to higher load conditions.

In RIS-augmented DI SI embodiments of the HCRI process (hereinafter called a "RIS-DISI" process embodiment of HCRI process 100), the two main problems associated with DI SCRI are overcome via several steps. First, with the homogenous pre-placement of RI species in the charge, the fuel distribution is made significantly leaner at low loads. Because of the RI species this distribution need not be stratified. Then, both the average fuel leanness of the charge and the initial concentration of RI species in the air charge ($R_{conc}$) are each adjusted (almost proportionally in opposite directions) to enable the RIS-DISI engine to function over the entire engine-operating regime. Why this works follows from the same explanation given above for how the presence of the RI species the RIS-PCSI process embodiment accomplishes the following four things simultaneously: (1) increases the ignitability of the fuel, (2) increases the rate of combustion of the fuel-air mixture within the flame front, (3) facilitates a measure of control over the speed of the flame front and (4) sometimes enables additional combustion outside the flame front.

Additionally, the RIS-DISI process embodiment of HCRI process 100 does not normally produce much if any soot when running on gasoline and fuel with similar characteristics. Rationale for why this is so follows from the same reasons given above for how the RIS-DICI embodiment accomplishes the following three things: (1) enables leaner fuel operations and thus richer air combustion (reducing soot creation), (2) demolishes soot formations that are still inadvertently generated via high-speed RI species-oxygen laden highly-turbulent jets strategically aimed into the main combustion chamber, (3) produces and distributes RI species that serve as "cetane improvers."

Subject to the applicable portions of the earlier general descriptions, the IC engine embodiments schematically depicted in FIG. 2A-2B (for HCRI engine 200), FIG. 4A-4D (for HCRI engine 300), FIG. 5A-5C (for HCRI engine 400) and FIG. 6A-6D (for HCRI engine 500) are all examples of engine configurations capable of using and enabling all four of the RIS-augmentation process embodiments of HCRI process 100 described in the forgoing (the RIS-PCCI process embodiment, the RIS-DICI process embodiment, the RIS-PCSI process embodiment and the RIS-DISI process embodiment). A general means exist for the operation of all three of these IC engine embodiments of HCRI engine 200 (300, 400 and 500) as any of the four RIS-augmented process embodiments of HCRI process 100. The general means for this is the operation of the generalized process embodiment of the general thermo-fluid chemical-kinetics process invention (HCRI process 100) in the exemplary IC engine embodiment (HCRI engine 200) provided earlier in detail and applied to the general distinctions of the RIS-PCCI process embodiment, the RIS-DICI process embodiment, the RIS-PCSI process embodiment and the RIS-DISI process embodiment described in the forgoing. In the interest of both brevity and clarity, the description of some of the common features of operation in the three example IC engine embodiments (HCRI engine 300, HCRI engine 400 and HCRI engine 500) are omitted and the description of these features of operation with respect HCRI process 100 depicted in FIGS. 1 and its detailed description of operation in HCRI engine 200 are being relied upon to provide adequate descriptions of the common features of operation omitted for these four RIS-augmented process embodiments. In particular, the thrust of the HCRI process 100's detailed description is applied to the RIS-augmented PCCI, DI CI, PCSI and DI SI cases, and its description, as given, fully explains the RIS-PCCI, RIS-DICI, RIS-PCSI and RIS-DISI process embodiments of HCRI process 100.

Further, for clarity of the general description, aims of the engine electronic control system 30 must be considered in the operation of the HCRI engine 200 and its three example HCRI engine embodiments (300, 400 and 500) with the RIS-PCCT, RIS-DICI, RIS-PCSI and RIS-DISI process embodiments of HCRI process 100. The engine electronic control system 30 must ensure the total amount and timings of fuel inserted into the main chamber 34, the timings and amounts of control fluid insertion into the M-C's 32 and the use of all RI-species generation augmentation-control devices 54, 64 and 70 (if any or all are employed) are all consummated with the engine operating conditions and specifications in manners appropriate to these embodiments. For all of these embodiments, the total amount of RI species generated, carried over, recycled and conveyed to assist ignition in later cycles must be that amount needed to assist in the manner desired (without dominating) in the ignition event in those cycles, resulting (in comparison with the conventional ignition modes) in reductions in required heat and required fuel concentrations relative to oxygen concentrations for ignition of the fuel. Also these control devices are to be operated in ways that together ensure that the work-power output of the engine is in accordance with operational load and speed requirements. For the two CI RIS-augmentation variants these control devices must also ensure ignition at the right timings.

From the forgoing discussions concerning the four RIS-augmentations of HCRI process 100, it should now be clear how the ignition mechanisms of these augmentation embodiments of HCRI process 100 are hybrids of the sub-mechanisms of the conventional technologies being augmented and of the sub-mechanisms of full HCRI. In the premixed CI augmentation variant (RIS-PCCI) the combustion is homogeneous and in the DI fuel augmentation (RIS-DICI) and in the SI augmentation RIS variants (RIS-DISI and RIS-PCSI) the combustion is locally (but not globally/chamber-wide) more homogeneous than it is in their conventional counterparts.

What is claimed:

1. A method for controlling a reduction in required heat and required fuel concentrations relative to oxygen concentrations for an ignition of a fuel within a main combustion chamber of an engine, the method comprising:
   providing a plurality of radical ignition species, the plurality of radical ignition species generated in at least one prior combustion cycle in at least one secondary chamber associated with the main combustion chamber of the engine, wherein the plurality of radical ignition species is generated by at least one OH-radical ignition species driven chemical kinetic mechanism;
   directing a portion of the plurality of radical ignition species to the main combustion chamber;
   regulating an accumulation of the portion of the radical ignition species and a generated radical ignition species of the main combustion chamber to modulate an ignition event for fuel in the main combustion chamber.

2. The method of claim 1, wherein the accumulation of the portion of the radical ignition species and a generated radical ignition species of the main combustion chamber are used to modulate the ignition event, and wherein the ignition event further comprises driving the ignition event by a chain-initiation reaction $H_2O_2+M=OH+OH+M$ and chain-branching reactions involving direct fuel decomposition by OH.

3. The method of claim 1, further comprising initiating the ignition event by compression, wherein the accumulation of the portion of the radical ignition species and a generated radical ignition species of the main chamber are used to modulate the ignition event and a combustion of the fuel, such that the reaction $H_2O_2+M=OH+OH+M$ contributes to the reduction in required heat and required fuel concentrations relative to oxygen concentrations for the ignition of the fuel.

4. The method of claim 1, further comprising initiating the ignition event by an ignition-timing device, wherein the accumulation of the portion of the radical ignition species and a generated radical ignition species of the main combustion chamber are used to modulate the ignition event and a combustion of the fuel, such that the reaction $H_2O_2+M=OH+OH+M$ contributes to the reduction in required heat and required fuel concentrations relative to oxygen concentrations for the ignition of the fuel.

5. The method of claim 1, wherein the fuel is inserted directly into the main combustion chamber after a start of a main-compression event of the engine for the ignition.

6. The method of claim 1, wherein the regulation of the accumulation of the portion of the radical ignition species and the generated radical species of the main chamber further comprises controlling an amount of the plurality of radical ignition species directed to said main combustion chamber.

7. The method of claim 6, wherein the regulation of the accumulation of the portion of the radical ignition species and the generated radical species of the main combustion chamber further comprises controlling an amount of the plurality of radical ignition species directed to said main combustion chamber using means configured to modulate at least one of the following:
manifold pressures of a plurality of intake gases entering the engine;
manifold pressures of a plurality of exhaust gases exiting the engine;
portions of a plurality of exhaust gases recycled;
travel schedules of intake valves;
travel schedules of exhaust valves;
cross-sectional areas of intake ports;
cross-sectional areas of exhaust ports;
flow patterns of intake gases;
pressures in the engine; and
compression ratios of the engine.

8. The method of claim 1, wherein the regulation of the accumulation of the portion of the radical ignition species and the generated radical species of the main chamber further comprises controlling a production of the plurality of radical ignition species.

9. The method of claim 8, wherein the regulation of the accumulation of the portion of the radical ignition species and the generated radical species of the main combustion chamber further comprises controlling the production of the plurality of radical ignition species a plurality of gases in the at least one secondary chamber using means that modulate at least one of the following:
chemical composition of the gases in the secondary chambers;
chemical activities of the gases in the secondary chambers;
rates of chemical activities of the gases in the secondary chambers;
temperatures of the gases in the secondary chambers;
pressures of the gases in the secondary chambers; and
volumes of the secondary chambers.

10. The method of claim 8, wherein the regulation of the accumulation of the portion of the radical ignition species and the generated radical species of the main chamber further comprises supplementing the accumulation of the portion of the radical ignition species and the generated radical species of the main chamber with a predetermined portion of a plurality of recycled exhaust gases using means configured to modulate at least one of the following:
chemical composition of the predetermined portion of the recycled exhaust gases;
chemical activity of the portion of the recycled exhaust gases;
rates of chemical activity of the portion of the recycled exhaust gases;
temperature the portion of the recycled exhaust gases; and
pressures of the portion of the recycled exhaust gases.

11. A process for chemically modulating combustion of a fuel within an engine using a predetermined amount of a plurality of radical ignition species, the process comprising:
a. providing at least one secondary chamber connected by at least one conduit to a variable volume main combustion chamber;
b. directing the predetermined amount of the plurality of radical ignition species generated at least in part in at least one previous cycle within the engine to the variable volume main combustion chamber to mix with a new air charge of the variable volume main combustion chamber prior to an end of a main-compression event;
c. trapping a second portion of the variable volume main combustion chamber air and the fuel in at least one secondary chamber during the main-compression event;
d. using the predetermined amount of the plurality of radical ignition species in the variable volume main combustion chamber to act as an agent to first activate a pre-ignition event of the fuel by driving a pre-ignition chemistry involving fuel decomposition via radicals and to then initiate a start of an ignition chemistry of an ignition event that drives fuel decomposition via OH;
e. using peaked pressures generated by the ignition event and a combustion of the fuel to drive OH and energy from the variable volume main combustion chamber into at least one secondary chamber, and
f. using OH and an energy transferred from the variable volume main combustion chamber and a second plurality of radical ignition species resident in the secondary chambers to drive an OH-radical species driven fuel decomposition sub-mechanism or plurality of OH-radical species driven fuel decomposition sub-mechanisms in the at least one secondary chamber for a generation of additional radical ignition species.

12. The process recited in claim 11, wherein the generation of the plurality of radical ignition species in the at least one secondary chamber is controlled using at least one secondary chamber radical ignition species generation regulation device, wherein at least one secondary chamber radical ignition species generation regulation device is configured to control at least one of the following:
a. managing of fuel concentrations in the at least one secondary chamber relative to oxygen concentrations, concentrations of the plurality of radical ignition species, and OH radical concentrations;
b. managing of oxygen concentrations in the at least one secondary chamber relative to fuel concentrations, concentrations of the plurality of radical ignition species, and OH radical concentrations;

c. managing of other chemical species concentrations in the at least one secondary chamber relative to fuel concentrations, oxygen concentrations, concentrations of the plurality of radical ignition species, and OH radical concentrations;

d. modulating of temperatures maintained in the at least one secondary chamber, e. adjusting of operational volume size of the at least one secondary chamber, and f. managing at least one device in the list of devices, wherein the list of devices comprises a catalytic surface device, a variable surface area catalytic surface device a fuel reformation device, a chemical additive insertion device, a plasma generator device, an ultraviolet-light device, a microwave device and a pressure changing device.

13. The process recited in claim 11, wherein said predetermined amount of the radical ignition species is at least in part provided by using at least one regulation means configured to implement at least one of the following:

a. controlling recovery of the plurality of radical ignition species contained in a portion of a plurality of recycled exhaust gases, such that at least one method for controlling the plurality of radical ignition species recovered during a recycling exhaust gases further comprises:
  i. regulating the size of said portion of the recycled exhaust gases;
  ii. stabilizing the mass fraction of the plurality of radical ignition species within said portion of the recycled exhaust gases;
  iii. adjusting the quantity of the plurality of radical ignition species within said portion of the recycled exhaust gases; and
  iv. adding chemical species to the plurality of radical ignition species within said portion of recycled exhaust gases;

b. making use of the new air charge entering the engine during an intake event together with a part of the plurality of radical ignition species contained in said portion of the recycled exhaust gases to augment the plurality of radical ignition species entering the engine during the intake event, and c. controlling conveyance to the variable volume main combustion chamber of at least some part of the plurality of radical ignition species generated previously.

14. The process recited in claim 11, wherein use is made of direct insertion of the fuel into the variable volume main combustion chamber after the start of the main-compression event.

15. The process recited in claim 11, wherein use is made of insertion of the fuel into the variable volume main combustion chamber prior to the start of the main-compression event.

16. An apparatus for improving an internal combustion engine comprising a cylinder, the cylinder further comprising at least one variable volume combustion chamber defined by a work-power producing component moving within a space bounded externally by a cylinder housing, wherein the cylinder is configured to periodically receive a fuel and an air charge and to implement a combustion cycle comprising an intake, main-compression, combustion, power-expansion and exhaust portions phases, the apparatus comprising:

a) at least one mini-chamber arranged about the cylinder housing of the cylinder in proximity with the at least one variable volume combustion chamber, wherein the at least one mini-chamber is configured to serve as origination sites for a generation of a plurality of radical ignition species;

b) at least one connecting conduit configured to couple the at least one mini-chamber with an associated the at least one variable volume combustion chamber, said at least one connecting conduit also configured to allow flow of the plurality of radical ignition species, the air, the fuel and chemical reaction products in and out of the at least one mini-chamber during various phases of the combustion cycle; and c) at least one controller associated with the at least one mini-chamber configured to regulate an amount of the plurality of radical ignition species provided to the at least one variable volume combustion chamber based upon load and speed requirements applied to said engine.

17. The apparatus recited in claim 16, wherein at least one insertion device is configured to direct inject at least some portion of the fuel into the at least one variable volume main combustion chamber.

18. The apparatus recited in claim 16, wherein at least one insertion device is configured to insert at least some premixed portions of the fuel and the air charge for use in the at least one variable volume main combustion chamber.

19. The apparatus recited in claim 16, wherein the at least one controller is associated with the at least one mini-chamber and includes at least one of the following means:

a) a means for distributing a control fluid into the at least one mini-chamber such that fuel concentrations therein are regulated, b) a means for distributing a control fluid into the at least one mini-chamber such that oxygen concentrations therein are regulated, c) a means for varying the volume of the at least one mini-chamber such that the volumes thereof are regulated, d) a means for modulation of temperatures associated with the at least one mini-chamber such that temperatures therein are regulated, e) a means for modulation of pressures associated with the at least one mini-chamber such that pressures therein are regulated, f) a controllable catalytic surface, g) a controllable surface area catalytic surface, h) a controllable fuel reformation device, i) a controllable plasma generation device, j) a controllable ultraviolet-light device, k) a controllable microwave device, l) a controllable chemical additive device, m) a means for varying a flow within the at least one mini-chamber, n) a means for varying a geometry of the at least one mini-chamber such that said geometry is regulated, o) a means for varying a geometry of the at least one connecting conduit of the at least one mini-chamber such that said geometry of said at least one connecting conduit is regulated, and p) a means for regulating a quantity of the fuel entering the at least one mini-chamber via the at least one conduit.

20. The apparatus recited in claim 19, wherein the at least one controller is being managed via a device in communication with a data structure, wherein data stored in the data structures is related to an operation of the internal combustion engine under varying load and speed conditions.

21. The apparatus recited in claim 16, wherein the at least one controller includes at least one of the following means:

a) a regulator for controlling a quantity of the radical ignition species conveyed within a recycled portion of a plurality of exhaust gases to the combustion cycle, wherein said regulator is configured to implement at least one of the following:
  i. magnitude regulation of said recycled portion of the exhaust gases to the at least one variable volume combustion chamber in order to control said quantity conveyed,
  ii. magnitude regulation of a percentage of said radical ignition species conveyed within said recycled portion by stabilizing said percentage of said quantity conveyed,
  iii. magnitude regulation of said radical ignition species conveyed within said recycled portion, whereby regulation is accomplished via controlling parameters that can reduce a share of said quantity conveyed,
  iv. magnitude regulation of said radical ignition species conveyed within said recycled portion, whereby regulation is accomplished via controlling parameters affecting at least one radical ignition species driven chemical kinetics mechanism in order to generate a part of said quantity conveyed, and
  v. magnitude regulation of said radical ignition species conveyed within said recycled portion that have been mixed with at least a part of the said air charge supplied, whereby regulation is accomplished via controlling parameters affecting at least one radical ignition species driven chemical kinetics mechanism in order to generate a measure of said quantities conveyed, and
b) a managing device for controlling a conveyance of said radical ignition species from a previous of said combustion cycle to the at least one variable volume combustion chamber for use in the combustion cycle, wherein said managing device is configured to control at least one of the following actions:
  i. valve actions,
  ii. extra valve actions,
  iii. actions associated with intake ports,
  iv. actions associated with exhaust ports,
  v. actions that affect intake manifold pressures,
  vi. actions that affect exhaust manifold pressures,
  vii. actions that affect intake manifold temperatures,
  viii. actions that affect compression ratios of the engine,
  ix. actions that affect flow patterns of intake gases, and
  x. actions that affect flow rates of intake gases.

22. The apparatus recited in claim 21, wherein the at least one controller is being managed via a device in communication with a data structure, wherein data stored in the data structures is related to an operation of the internal combustion engine under varying load and speed conditions.

23. The apparatus recited in claim 16, wherein said internal combustion engine is a rotary combustion engine.

24. The apparatus recited in claim 23, wherein the at least one mini-chamber is located to enable a bulk of the radical ignition species generated therein to be conveyed to an other variable volume combustion chamber of a later of said combustion cycle that immediately follows said combustion cycle, whereby the at least one variable volume combustion chamber of said combustion cycle is not said other variable volume combustion chamber of the later combustion cycle that immediately follows.

25. The apparatus recited in claim 23, wherein said internal combustion engine is a DI fuel full homogeneous combustion radical ignition engine.

26. The apparatus recited in claim 23, wherein said internal combustion engine is a premixed air and fuel charge full homogeneous combustion radical ignition engine.

27. The apparatus recited in claim 23, wherein said internal combustion engine makes use of said amount of the radical ignition species to augment compression ignition in the at least one variable volume main combustion chamber.

28. The apparatus recited in claim 23, wherein said internal combustion engine makes use of said amount of the radical ignition species to augment spark ignition in the at least one variable volume main combustion chamber.

29. The apparatus recited in claim 16, wherein said internal combustion engine is a two-stroke reciprocating piston engine.

30. The apparatus recited in claim 29, wherein the at least one controller is used to adjust boast pressures of the periodically received of said air charge in a manner that regulates retention of a combustion gases residual of a previous combustion cycle that immediately precedes said combustion cycle.

31. The apparatus recited in claim 29, wherein said internal combustion engine is a DI fuel full homogeneous combustion radical ignition engine.

32. The apparatus recited in claim 29, wherein said internal combustion engine is a premixed air and fuel charge fall homogeneous combustion radical ignition engine.

33. The apparatus recited in claim 29, wherein said internal combustion engine makes use of said amount of the radical ignition species to augment compression ignition in the at least one variable volume main combustion chamber.

34. The apparatus recited in claim 29, wherein said internal combustion engine makes use of said amount of the radical ignition species to augment spark ignition in the at least one variable volume main combustion chamber.

35. The apparatus recited in claim 16, wherein said internal combustion engine is a four-stroke reciprocating piston engine.

36. The apparatus recited in claim 35, wherein the at least one controller is an adjusted travel schedule for at least one valve associated with the at least one variable volume combustion chamber such that a conveyance of the radical ignition species of the at least one mini-chamber of said combustion chamber is modified.

37. The apparatus recited in claim 35, wherein the at least one controller is used to adjust a quantity of the radical ignition species recycled via exhaust gases.

38. The apparatus recited in claim 35, wherein the at least one controller is used with a quantity of the radical ignition species being recirculated via recycled exhaust gases to facilitate a regulated generation of more of the radical ignition species for the combustion cycle.

39. The apparatus recited in claim 35, wherein said internal combustion engine is a DI fuel full homogeneous combustion radical ignition engine.

40. The apparatus recited in claim 35, wherein said internal combustion engine is a premixed air and fuel charge full homogeneous combustion radical ignition engine.

41. The apparatus recited in claim 35, wherein said internal combustion engine makes use of said amount of the radical ignition species to augment compression ignition in the at least one variable volume main combustion chamber.

42. The apparatus recited in claim 35, wherein said internal combustion engine makes use of said amount of the radical ignition species to augment spark ignition in the at least one variable volume main combustion chamber.

* * * * *